US011916306B2

(12) United States Patent
Jesme et al.

(10) Patent No.: US 11,916,306 B2
(45) Date of Patent: Feb. 27, 2024

(54) VOLUME BASED GRADIENT INDEX LENS BY ADDITIVE MANUFACTURING

(71) Applicant: 3M INNOVATIVE PROPERTIES COMPANY, St. Paul, MN (US)

(72) Inventors: Ronald D. Jesme, Plymouth, MN (US); Thomas J. Brace, St. Paul, MN (US); Justin M. Johnson, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 659 days.

(21) Appl. No.: 17/247,970

(22) Filed: Jan. 4, 2021

(65) Prior Publication Data

US 2021/0151882 A1 May 20, 2021

Related U.S. Application Data

(63) Continuation of application No. 15/108,668, filed as application No. PCT/US2014/071393 on Dec. 19, 2014, now Pat. No. 10,886,613.

(Continued)

(51) Int. Cl.
*H01Q 3/00* (2006.01)
*B29C 64/106* (2017.01)
(Continued)

(52) U.S. Cl.
CPC .............. *H01Q 3/44* (2013.01); *B29C 64/106* (2017.08); *H01Q 15/08* (2013.01);
(Continued)

(58) Field of Classification Search
CPC .. G02B 3/0087; G02B 2207/107; H01Q 3/44; H01Q 15/08; B29C 64/106; B29L 2011/0016; B29D 11/00355
(Continued)

(56) References Cited

U.S. PATENT DOCUMENTS 6,855,478 B2  2/2005  DeVoe
8,099,024 B2  1/2012  Stelter
(Continued)

FOREIGN PATENT DOCUMENTS

| CN | 1039955304 | 8/2014 |
| WO | WO 1994-016392 | 7/1994 |
| WO | WO 2001-096915 | 12/2001 |

OTHER PUBLICATIONS

Allen et al., Design and fabrication of an RF GRIN lens using 3D printing technology, Proceedings of SPIE8624, Terahertz, RF, Millimeter, and Submillimeter-Wave technology and Applications VI, 86240V, vol. 8624, Mar. 27, 2013 (Mar. 27, 2013), p. 86240V, XP05517677 (Year: 2013).*

Allen, "Design and fabrication of an RF GRIN lens using 3D printing technology", Proceedings of SPIE, vol. 8624, 2013, pp. 86240V-1-86240V-7, XP055176774.

Cho, "Local Composition Control in Solid Freeform Fabrication", 2001, pp. 1-11, XP055176779.

(Continued)

*Primary Examiner* — James C. Jones
*Assistant Examiner* — Henry Duong
(74) *Attorney, Agent, or Firm* — Sriram Srinivasan; X. Christina Huang

(57) ABSTRACT

Techniques are described for forming a gradient index (GRIN) lens for propagating an electromagnetic wave comprising receiving, by a manufacturing device having one or more processors, a model comprising data specifying a plurality of layers, wherein at least one layer of the plurality of layers comprises an arrangement of one or more volume elements comprising a first dielectric material and a second dielectric material, wherein the at least one layer of the plurality of layers has a dielectric profile that is made up of a plurality of different effective dielectric constants of the volume elements in the layer, and generating, with the manufacturing device by an additive manufacturing process, the GRIN lens based on the model.

19 Claims, 16 Drawing Sheets

Related U.S. Application Data

(60) Provisional application No. 61/922,298, filed on Dec. 31, 2013.

(51) Int. Cl.
    *H01Q 3/44* (2006.01)
    *H01Q 15/08* (2006.01)
    *B29L 11/00* (2006.01)
    *G02B 3/00* (2006.01)

(52) U.S. Cl.
    CPC ..... *B29L 2011/0016* (2013.01); *G02B 3/0087* (2013.01); *G02B 2207/107* (2013.01)

(58) Field of Classification Search
    USPC ......................................................... 359/652
    See application file for complete search history.

(56) References Cited

U.S. PATENT DOCUMENTS

| 8,270,790 | B2 | 9/2012 | Ogawa et al. |
|---|---|---|---|
| 2010/0224232 | A1 | 9/2010 | Cummings |

OTHER PUBLICATIONS

Good, "Design of Graded Index Flat Lenses With Integrated Antireflective Properties", Microwave And Optical Technology Letters, 2012, vol. 54, No. 12, pp. 2774-2781, XP055176772.

Mei, "Gradient Index Microwave Lens Using Metal Strip", Microwave Technology and Computational Electromagnetic, 2009, pp. 162-165.

Moore, "Gradient Index Optics", Chapter 9, pp. 9.1-9.10.

Stratasys, "ABS-M30 Production-Grade Thermoplastic for Fortus 3D Production Systems", pp. 1-2.

Trost, "Using Drop-On-Demand Technology for Manufacturing Grin Lenses", 2001, pp. 533-536, XP055122645.

Wu, "Flat Transformation Optics Graded-Index (TO-GRIN) Lenses", 6th European Conference on Antennas and Propagation (EUCAP), 2011, pp. 1701-1705.

Xue, "Electronically Reconfigurable Microwave Lens Antennas", $2^{nd}$ Six Monthly Report, 2005, pp. 1-53.

Xue, "Printed Holey Plate Luneburg Lens", Microwave And Optical Technology Letters, 2008, vol. 50, No. 2, pp. 378-380, XP055176771.

International Search report for PCT International Application No. PCT/US2014/071393, dated Mar. 24, 2015, 4 pages.

\* cited by examiner

VOLUME BASED GRADIENT INDEX LENS BY ADDITIVE MANUFACTURING

CROSS REFERENCE TO RELATED APPLICATIONS

This application is a continuation of U.S. patent application Ser. No. 15/108,668 filed 28 Jun. 2016, now granted U.S. Pat. No. 10,886,613 issued on 5 Jan. 2021, which is a US 371 Application based on International Application No. PCT/US2014/071393 filed on 19 Dec. 2014, which claims the benefit of Provisional U.S. Patent Application No. 61/922,298 filed 31 Dec. 2013, the entire disclosures of all of which are incorporated by reference herein.

TECHNICAL FIELD

The disclosure relates to manufacturing three-dimensional (3D) structures. In particular the present disclosure relates to a fabrication process for 3D optical structures.

BACKGROUND

Available radio-frequency spectra are frequently limited by jurisdictional regulations and standards. The increasing demand for bandwidth (i.e., increased data throughput) leads to the emergence of a number of wireless point-to-point technologies that offer fiber data rates and can support dense deployment architectures. Millimeter wave communication systems can be used for this function, providing operational benefits of short links, high data rates, low cost, high density, high security, and low transmission power.

These advantages make millimeter wave communication systems beneficial for sending various waves in the radio-frequency spectrum. Coaxial cables are available for carrying such millimeter waves, though the cables are currently very expensive to incorporate in a millimeter wave communication system.

Manufacturing techniques for fabricating millimeter wave or optical devices and other structures include bulk machining techniques, such as grinding lenses; precision molding to create aspheric surfaces; and planar technological methods to produce thin film devices. These processes generally produce components which require assembly into a system. Examples of manufactured millimeter wave or optical devices include physical gradient-index (GRIN) lenses which may take the form of conventional biconvex lenses.

Known fabrication methods for creating structures such as GRIN lenses for radio frequency and acoustic systems may require energy-consumptive processing, and may be time-consuming. GRIN lenses have been made using several techniques, including neutron irradiation, chemical vapor deposition, partial polymerization, ion exchange, and ion stuffing.

SUMMARY

In general, the disclosure relates to lenses, and techniques for forming the lenses. For example, the disclosure describes the formation of gradient-index (GRIN) lenses for use by various radio-frequency (RF) frequencies. For example, in accordance with the techniques of this disclosure a GRIN lens may be formed by an additive manufacturing process, such as by being printed with a 3D printer, where the surfaces of the lens can be flat, curved or stepped. The material forming the lens can be printed in a pattern with a controlled amount of sub-wavelength voids to control a local density, effective local dielectric constant, or effective local relative permittivity, and local index of refraction. These local parameters can be continuously varied throughout the volume of the lens to produce a lens with independently controlled optical performance and physical shape, as printed by a 3D printer.

In one example of a method of forming a gradient index (GRIN) lens for propagating an electromagnetic wave, the method comprising receiving, by a manufacturing device having one or more processors, a model comprising data specifying a plurality of layers, wherein at least one layer of the plurality of layers comprises an arrangement of one or more volume elements comprising a first dielectric material and a second dielectric material, wherein the at least one layer of the plurality of layers has a dielectric profile that is made up of a plurality of different effective dielectric constants of the volume elements in the layer, and generating, with the manufacturing device by an additive manufacturing process, the GRIN lens based on the model.

In another example, a gradient index (GRIN) lens for propagating an electromagnetic wave, the lens comprising a plurality of layers additively formed to comprise a plurality of volume elements, wherein at least one layer of the plurality of layers comprises an arrangement of the one or more volume elements comprises a first dielectric material and a second dielectric material, wherein the volume elements are formed by an additive manufacturing process, wherein the at least one layer of the plurality of layers has a dielectric profile that is made up of a plurality of different effective dielectric constants of the volume elements in the layer, and wherein each of the local effective dielectric constants is a function of a volumetric ratio of the first dielectric material to the second dielectric material in the respective volume elements, a dielectric constant of the first dielectric material, and a dielectric constant of the second dielectric material.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
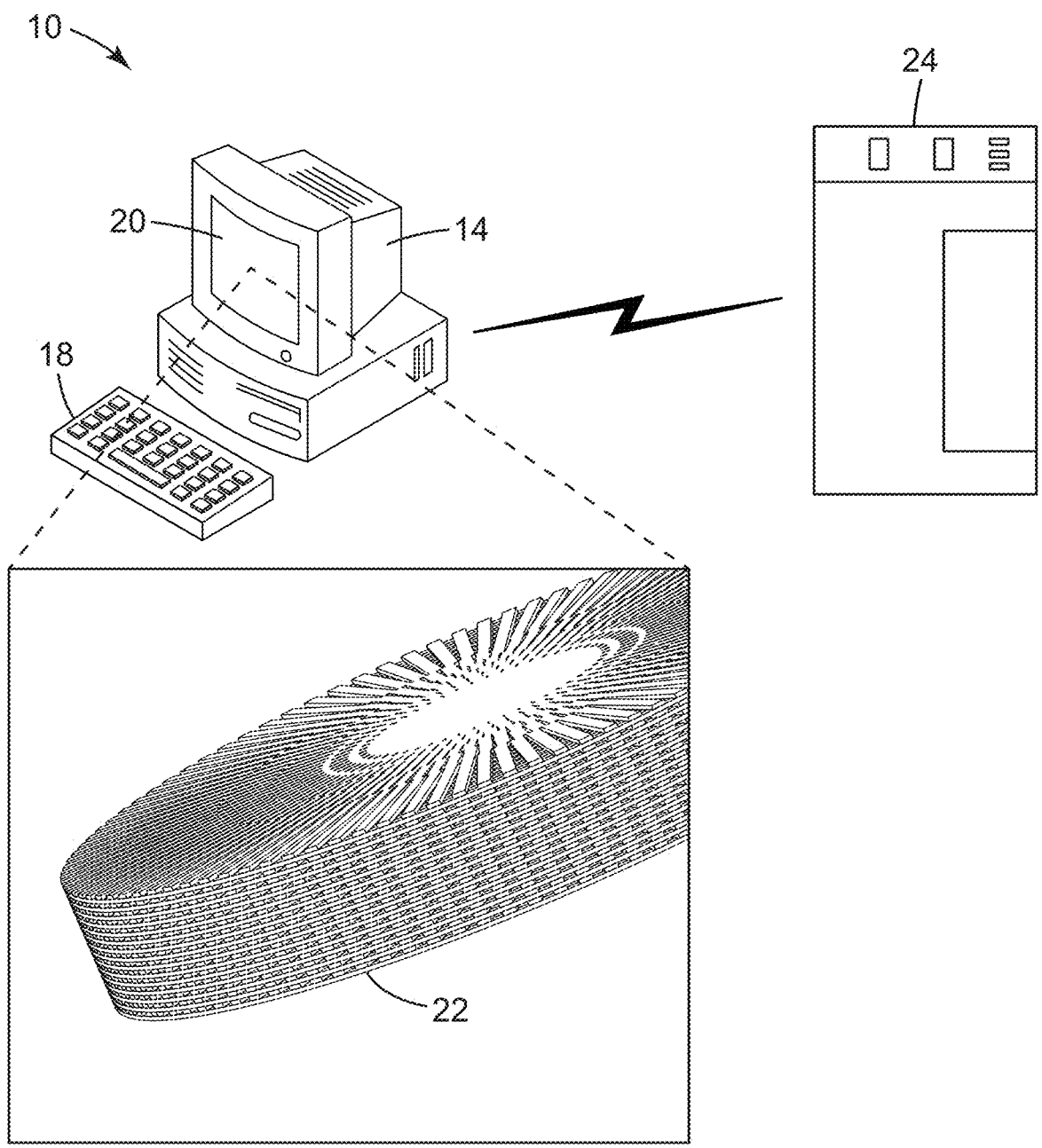
FIG. 1 is a block diagram illustrating an example of a three-dimensional (3D) gradient index (GRIN) lens generation environment.

The present disclosure describes techniques for creating, customizing, and generating gradient-index (GRIN) lenses that correspond to a different GRIN lens structure while maintaining a similar dielectric constant profile. For example, techniques are described for creating a digital GRIN lens representation within a virtual environment, capturing information therefrom, and generating, through additive manufacturing, physical GRIN lenses that correspond to the digital GRIN lens representation. Further, at least some aspects of the present disclosure are directed to techniques for managing multiple aspects of GRIN lenses, such as dielectric constant, shape, or the like. The term "dielectric constant" as used herein refers to the relative permittivity of the physical GRIN lens, and the terms "dielectric constant" and "relative permittivity" may be used interchangeably.

In general, GRIN lenses can include physical GRIN lenses and digital GRIN lens representations. Physical GRIN lenses generally refer to physical objects with a general boundary, weight, and shape used to focus light (including infrared and ultraviolet) or other electromagnetic signals, such as extremely high frequency (EHF) signals with frequencies from 30 to 300 gigahertz (GHz), for example. Physical GRIN lenses can include the resulting objects after being built, molded, or produced, for example by a computer numerical control (CNC) machine, a 3D printer, or the like, based on a digital GRIN lens representation.

Using the techniques of the disclosure, a GRIN lens may be printed with an additive manufacturing device, such as a 3D printer, for use at RF frequencies, where the surfaces of the lens can be flat, curved or stepped, and the material can be printed in a pattern with a controlled amount of sub-wavelength voids to control the local density, effective local dielectric constant, and local index of refraction. These local parameters can be continuously varied throughout the volume of the lens to produce a lens with independently controlled optical performance and physical shape, as printed by an additive manufacturing device. Control of the refractive index in dimensions x, y and z, enables unique constructions that can provide a lens function while also providing control of numerous aberrations, including spherical and chromatic aberrations, while also providing design freedom for the lens surfaces.

Moreover, using one or more techniques described in this disclosure, lenses having a wide variety of shapes or contours may be created to conform to any desired dielectric profile, such as a dielectric profile of a biconvex GRIN lens. Physical GRIN lenses can have various shapes and sizes. As one example, a physical GRIN lens may have a 50 millimeter (mm) diameter and 7.8 mm thickness. In some cases, physical GRIN lenses may have known shapes and/or dimensions that conform to standards. For example, a lens may be formed to take a conventional lens shape such as a convex and/or concave lens, or may be formed in other known shapes, which may not be limited to geometric shapes, such as squares, rectangles, circles, or the like. In some examples, physical GRIN lenses may have a variety of contours, continuous or otherwise, such as curved contours and flat contours. Moreover, in one example, a dimension of a lens such as diameter may be smaller than a specified number of wavelengths, such as 10 wavelengths. In other cases, using one or more techniques described in this disclosure, physical GRIN lenses may have non-standardized shapes, and/or irregular dimensions.

The term "digital GRIN lens representation" is used herein to refer to digital objects with information and/or virtual boundaries, such as number of voxels per layer, and the effective dielectric constant of each voxel necessary to achieve a dielectric profile based on the plurality of effective dielectric constants. Digital GRIN lens representations can be generated using digital inputs. Digital inputs can include, for example, keyboards, touch screens, mice, or the like.

In some cases, digital GRIN lens representations are created in a virtual space and may be representative of physical GRIN lenses. Virtual space may refer to a computer aided design (CAD) environment, for example, that allows a user to manually create or automatically generate a digital GRIN lens representation having desired parameters, such as shape, size, and dielectric profile. The virtual space may be referred to as a modeling space, workspace, or the like.

FIG. 1 is a block diagram illustrating an example of a GRIN lens generation environment 10. In the example of FIG. 1, GRIN lens generation environment 10 includes a computing device 14 to cause additive manufacturing (AM) device 24 to generate one or more physical GRIN lenses from model 22 of a digital GRIN lens representation. As described herein, computing device 14 provides an execution environment for one or more software applications that, as described, can efficiently generate and edit GRIN lens content for a large number of digital GRIN lens representations. In this example, a digital GRIN lens representation may be previously stored by computing device 14. As described, computing device 14 and the software applications executing thereon may perform a variety of fabrication-related operations, including automated generation of model 22 of a digital GRIN lens representation, and automatic fabrication of physical GRIN lenses representative of model 22 using additive manufacturing (AM) device 24.

In the example implementation, computing device 14 includes, among other components, presentation device 20 and keyboard 18. In addition, although not shown in FIG. 1, computing device 14 may include one or more processors, microprocessors, internal memory and/or data storage and other electronic circuitry for executing software or firmware to provide the functionality described herein.

Presentation device 20 may include, for example, an electronically addressable display, such as a liquid crystal display (LCD) or other type of display device for use with computing device 14. In some implementations, computing device 14 generates the content to display on presentation device 20 for the digital GRIN lens representation in a variety of views, for example, a top view, a bottom view, an exploded view, a layer by layer view, a voxel by voxel view, or the like. Computing device 14 may, in some cases, communicate display information for presentation by other devices, such as a tablet computer, a projector, or other external device.

Keyboard 18 may include, for example, a physical user interface, such as keys or other type of physical user interface device for use with computing device 14. Computing device 14 may, in some cases, generate model 22 based on the information received from a user (not shown) by keyboard 18.

As described herein, computing device 14, and the software executing thereon, provide a platform for creating and manipulating digital GRIN lens representations representative of physical GRIN lenses. For example, in general, computing device 14 is configured to create and/or generate model 22 of a digital GRIN lens representation. In some examples, model 22 is created by a user (not shown). In other examples, model 22 is stored in a database, as described in FIG. 2. Computing device 14 may provide AM device 24 data indicative of model 22 to allow AM device 24 to fabricate at least one physical GRIN lens (not shown) based on model 22.

AM device 24 is a device capable of making a three-dimensional physical object from a digital model. In one example, AM device 24 is a 3D printer that can print using an additive process, where successive layers of material are laid down in different shapes and/or line widths. This layering of material is different than traditional methods of machining, which may rely on the removal of material by cutting or drilling, also known as subtractive processes. In some examples, AM device 24 may use a two-photon photopolymerization process to create three-dimensional (3D) structure with micro- or nano-scale resolutions. Examples of a two-photon photopolymerization process are described in U.S. Pat. No. 6,855,478, issued Feb. 15, 2005, the entire contents of which are incorporated by reference herein.

As further described below, computing device 14 may implement techniques for automated generation of model 22 of digital GRIN lens representations, and extraction of information, content or other characteristics associated with each of the digital GRIN lens representations. For example, computing device 14 may allow a user fine-grained control over techniques used by computing device 14 to generate one or more models of digital GRIN lens representation, such as model 22. In accordance with the techniques described herein, computing device 14 may implement techniques for automatic generation of model 22 of a digital GRIN lens representation by processing a plurality of layers having a plurality of effective dielectric constants based on an overall dielectric constant profile. Computing device 14 may provide alternate shapes and/or sizes of model 22 based on the arrangement of the plurality of effective dielectric constants in the plurality of layers corresponding to the overall dielectric profile.

In some examples, the overall dielectric profile of the model 22 may include the plurality of effective dielectric constants defined by a plurality of voxels, and each voxel of model 22 may include a volume of a first dielectric material associated with a first dielectric constant and a volume of a second dielectric material associated with a second dielectric constant. In other examples, the plurality of voxels of model 22 may include an arrangement of one or more volume elements having an arrangement of one or more lines formed by the additive manufacturing process. In other examples, the overall dielectric profile may include the plurality of effective dielectric constants defined by a plurality of layers, where each layer may include a volume of a first dielectric material associated with a first dielectric constant and a volume of a second material associated with a second dielectric constant. In some examples, the first dielectric material may include a photo-reactive resin associated, e.g., having a relative dielectric constant of 2.8, and the second dielectric material may include air associated with a relative dielectric constant of about 1. The absolute dielectric constant of air is close the dielectric constant of a vacuum, which is roughly $8.8541878176 \times 10^{-12}$ F/m. A relative dielectric constant of 2.8 represents the absolute dielectric constant is 2.8 times greater than the dielectric constant of a vacuum.

A voxel may be a volume element and may represent a value on a regular grid in three-dimensional space. In some examples, voxels may also be an array of elements of volume that constitute a notional three-dimensional space. That is, each voxel in a plurality of voxels may form an array of discrete volume elements into which a representation of a three-dimensional object may be divided. In some examples, a voxel may be a volume element, where the volume element includes a particular volume (amount) of one or more dielectric materials. For example, in some cases a voxel may be comprised entirely of a volume of a first dielectric material, providing an effective dielectric constant for that voxel that is equal to the dielectric constant of the first dielectric material. In other examples, a voxel may comprise the combination of a volume of first dielectric material and a second dielectric material, whereby the effective dielectric constant for the voxel is a function effective of the respective dielectric constants of the one or more dielectric materials.

A layer may be a plurality of volume elements and represents a plurality of values on a regular grid in three-dimensional space. In some examples, a layer may have a plurality of voxels, such that the plurality of voxels may comprise a plurality of volumes between one or more dielectric materials. In other examples, a layer may have a plurality of effective dielectric constants defined by the plurality of volumes of the one or more effective dielectric constants.

In accordance with the techniques of this disclosure, based on model 22, AM device 24 can vary the ratios of the one or more dielectric materials, such as the ratio of the first dielectric material to the second dielectric material, can be varied on a voxel-by-voxel or layer-by-layer basis. In one example of the ratio between the first and second dielectric materials, the higher the ratio, the closer the density and effective dielectric constant of the unit cell (e.g., voxel) approaches the dielectric constant of the first dielectric material (e.g., bulk 3D print material). The lower this ratio, the closer the effective dielectric constant of the unit cell approaches the dielectric constant of the second dielectric material (e.g., free space, air, or whatever medium in which the physical GRIN lens structure is immersed).

In one example implementation, a voxel may be comprised entirely of a volume of a first dielectric material, such as thermoplastic resin or photo-reactive resin with an associated dielectric constant of 2.8. In this example, the effective dielectric constant for the voxel is 2.8 because the voxel is comprised entirely of the first dielectric material with an associated dielectric constant of 2.8. In another example, a voxel may be comprised of respective volumes of multiple (e.g., two or more) different dielectric materials, such as a first dielectric material (e.g., thermoplastic resin, photoreactive resin) with an associated first dielectric constant of 2.8, and a second dielectric material (e.g., air) with an associated second dielectric constant of 1. In some examples, the dielectric materials may be solids, liquids, or gases. In other examples, the effective dielectric constant for the voxel is effectively a function of the volumes between the first dielectric material and the second dielectric material and their respective dielectric constants.

In another example implementation, a digital GRIN lens representation modeling application executing on computing device 14 may separate model 22 into a plurality of layers representative of a plurality of different effective dielectric constants in a dielectric profile. In some example implementations, for each of the plurality of effective dielectric constants, computer device 14 may generate one or more of the layers with one or more dielectric materials corresponding to the effective dielectric constants of each layer. According to this layer approach, dielectric constants from the different layers are detected, and used to ultimately define the volume of one or more dielectric materials in each layer for an individual physical GRIN lens. As a result, each of the plurality of digital GRIN lens representations generated by digital GRIN lens representation modeling application 30 may be represented by a plurality of layers. In some examples, model 22 may represent the different effective dielectric constants of the layers by a different color. In other examples, the plurality of players of model 22 may include an arrangement of one or more volume elements having an arrangement of one or more lines formed by the additive manufacturing process.

In some example implementations, GRIN lenses formed according to the techniques of this disclosure may be used to provide a focusing function. In other example implementations, GRIN lenses formed according to the techniques of this disclosure may be used to create anti-reflective coatings and/or layers. In yet other example implementations, computing device 14 provides functionality by which a user is able to export the digital GRIN lens representation to other systems, such as cloud-based repositories (e.g., cloud server) or other computing devices (e.g., computer system or mobile device) (not shown).

In the example of FIG. 1, computing device 14 is illustrated for purposes of example as a desktop computer. However, in other examples, computing device 14 may be a tablet computer, a personal digital assistant (PDA), a smartphone, a laptop computer, or any other type of computing or non-computing device suitable for performing the techniques described herein.

Figure 2:
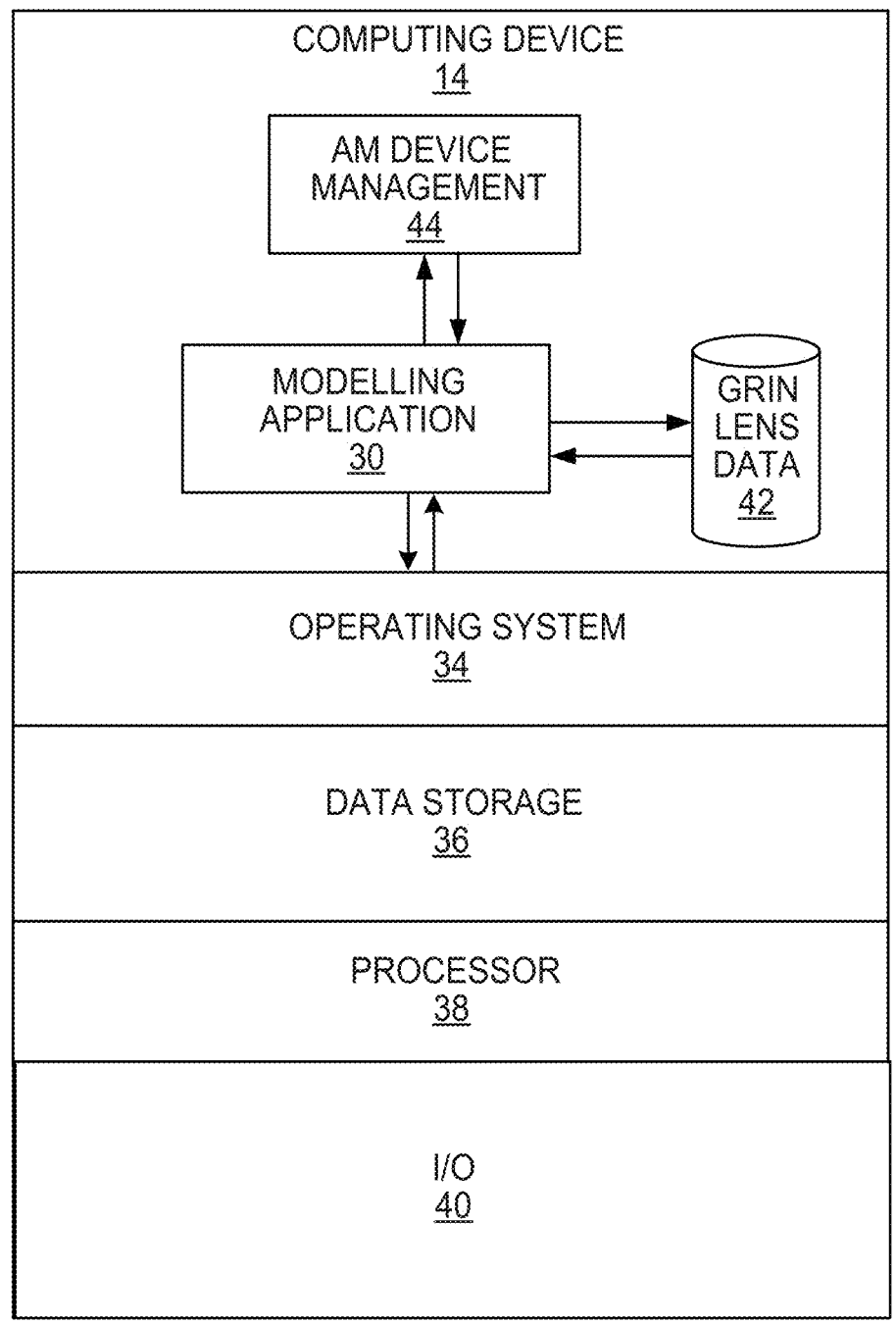
FIG. 2 is a block diagram illustrating an example of a computing device that operates in accordance with the techniques described herein.

FIG. 2 is a block diagram illustrating an example of a computing device that operates in accordance with the techniques described herein. For purposes of example, computing device 14 of FIG. 2 will be described with respect to computing device 14 of FIG. 1

In this example, computing device 14 includes various hardware components that provide core functionality for operation of the device. For example, computing device 14 includes one or more programmable processors 38 configured to operate according to executable instructions (i.e., program code), typically stored in a computer-readable medium or data storage 36 such as static, random-access memory (SRAM) device or Flash memory device. Input/Output (I/O) 40 may include one or more devices, such as keyboard 18 as described in FIG. 1, mouse, trackball, or presentation device 20 as described in FIG. 1, and provide wireless communication with other devices, such as a cloud server, a computer system, or AM device 24 as described in FIG. 1, via a wireless or wired communication interface as described in FIG. 1, such as but not limited to high-frequency radio frequency (RF) signals or universal serial bus (USB) connections. In another example, computing device 14 of FIG. 1 includes AM device management module 44 and GRIN lens data 42. Computing device 14 may include additional discrete digital logic or analog circuitry not shown in FIG. 2.

GRIN lens data 42 may be a database of GRIN lens models, for example, including model 22 as described in FIG. 1. In some examples, modeling application 30 may store GRIN lens models in GRIN lens data 42. In other examples, modeling application 30 may retrieve GRIN lens models from GRIN lens data 42.

AM device management 44 may control AM device 24 as described in FIG. 1. In some examples, modeling application 30 may retrieve a GRIN lens model from GRIN lens data 42 and output the GRIN lens model to AM device 24. In other examples, AM device management 44 may control AM device 24 using model 22 from modeling application 30, which may have retrieved model 22 from GRIN lens data 42 or generated model 22 from the input of a user.

In general, operating system 34 executes on processor 38 and provides an operating environment for one or more user applications, including modeling application 30. User applications may, for example, comprise executable program code stored in computer-readable storage device (e.g., data storage 36) for execution by processor 38. As other examples, the user applications may comprise firmware or, in some examples, may be implemented in discrete logic.

In operation, computing device 14 receives user input from a user through I/O 40, such as keyboard 18 as described in FIG. 1, and processes the user input in accordance with the techniques described herein. For example, modeling application 30 may create model 22 as described in FIG. 1, in a virtual space based on a plurality of layers, and each layer comprised of an array of voxels with a plurality of volumes of one or more dielectric materials. As another example, computing device 14 may receive digital GRIN lens representation data from internal sources, such as GRIN lens data 42, or external sources, such as a cloud server, a computer system, or a mobile device via I/O 40. In general, computing device 14 stores the digital GRIN lens representation data in GRIN lens data 42 for access and processing by modeling application 30 and/or other user applications.

As shown in FIG. 2, modeling application 30 may invoke kernel functions of operating system 34 to output data to for presenting information to a user of computing device, such as computing device 14 as described in FIG. 1. As further described below, modeling application 30 may generate a graphical user interface to provide an improved electronic environment for generating and manipulating model 22 of corresponding digital GRIN lens representations representative of physical GRIN lenses. For example, modeling application 30 may generate a graphical user interface to include a mechanism that allows a user to easily select shapes and sizes of one or more digital GRIN lens representations based on the desired dielectric profile. In some examples, the desired dielectric profile is selected to enable the GRIN lens to focus an electromagnetic wave. In other examples, the electromagnetic wave is within a millimeter wave band.

As described in further detail below, modeling application 30 may utilize automated GRIN lens profile techniques that separate model 22, as described in FIG. 1, into a plurality of layers. Modeling application 30 can, for each of the layers, arrange a plurality of voxels according to a desired shape and/or size corresponding to a plurality of effective dielectric constants of a desired dielectric profile. According to a voxel approach, each voxel may be individually defined as having one or more dielectric materials within each of the layers of model 22. Based on the volume of each of the one or more dielectric materials in the voxel, each voxel has an effective dielectric constant, and the local dielectric constant at a given position within the plurality of layers may correspond to the desired dielectric profile. In some cases, modeling application 30 may, for example, generate model 22 based on the input of a user selecting a desired size and shape of a GRIN lens to be formed having a dielectric profile, providing the desired functionality such as an imaging lens. In other cases, the imaging lens may be similar to the functionality of a solid biconvex GRIN lens. Moreover, modeling application 30 may output model 22 to AM device management 44 to control AM device 24, as described in FIG. 1.

To generate model 22, modeling application 30 may create a plurality of layers, where each layer has a plurality of effective dielectric constants corresponding to the desired dielectric profile, providing the desired functionality such as an imaging lens, similar to the functionality of a solid single dielectric constant biconvex lens. In some examples, modeling application 30 may change the dielectric constant of each layer by individually defining the effective dielectric constant of each voxel in a layer by controlling the volume of the one or more dielectric materials in each voxel. In other examples, modeling application 30 may change the dielectric constant of each layer by defining each layer with a volume of two or more dielectric materials, such that the volume of two or more dielectric materials corresponds to a plurality of effective dielectric constants across each layer, and as part of an overall dielectric profile. As a result, in this example, each of the plurality of digital GRIN lens representations generated by modeling application 30 for a given dielectric profile, such as a biconvex lens dielectric profile, may also be represented by a plurality of other digital GRIN lens representations with different shapes and/or sizes, and all of which correspond to the functionality of the imaging lens, such as a biconvex lens. In this manner, modeling application 30 may be used to generate data for fabricating a GRIN lens having a customized shape and size (e.g., form factor), and that also has a dielectric profile that results in a lens functionality (or wavefront manipulation) that approximates the functionality of a conventional biconvex lens.

Figure 3A:
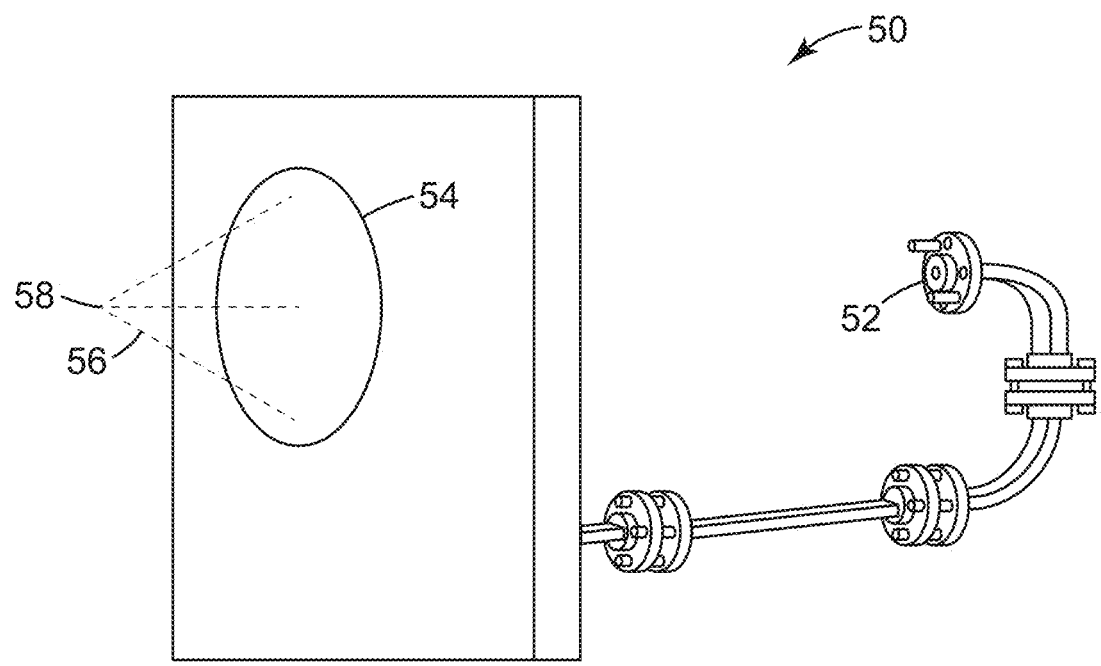
FIGS. 3A-3B are conceptual diagrams illustrating an example of a 3D GRIN lens focusing environment.
Figure 3B:
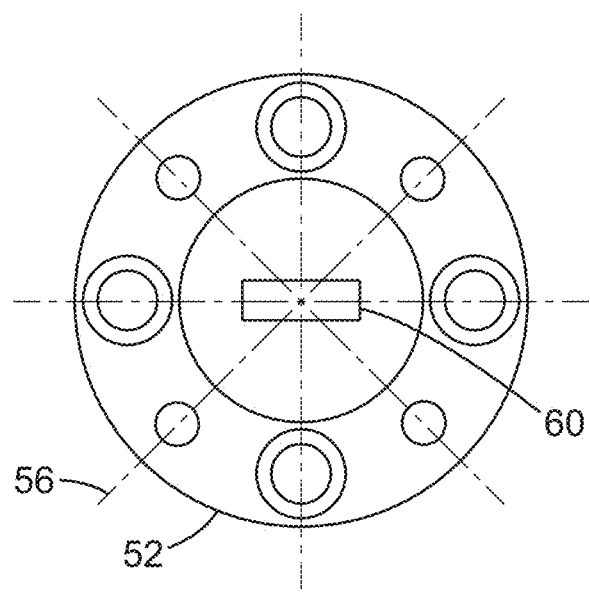

FIGS. 3A-3B illustrate an example of a three-dimensional (3D) GRIN lens focusing environment 50. In the example of GRIN lens focusing environment 50 includes FIG. 3A with waveguide 52 configured to guide transmission of electromagnetic waves 56, such as electromagnetic waves having a frequency of approximately 60 GHz, and FIG. 3B with 3D GRIN lens 54 to focus the electromagnetic waves, such as electromagnetic waves 56 at point 58.

In the example of FIGS. 3A & 3B, waveguide 52 is a structure for guiding and radiating electromagnetic waves 56. Waveguide 52 generally confines the signal to travel in one dimension. Electromagnetic waves 56 typically propagate in all directions as spherical waves when in open space. When this happens, electromagnetic waves 56 lose their power proportionally to the square of the distance traveled. Under ideal conditions, when waveguide 52 confines an electromagnetic wave to traveling in only a single direction, the wave loses little to no power while propagating.

In the example of FIGS. 3A & 3B, waveguide 52 is a structure with an opening (e.g., a flange) at each end of its length, the two openings, or, ports (such as port 60), being connected by a hollow portion along the length of the interior of the waveguide 52. Waveguide 52 can be made of copper, brass, silver, aluminum, for example, or other metal having a low bulk resistivity. In some examples, waveguide 52 can be made of metal with poor conductivity characteristics, plastic, or other non-conductive materials, if the interior walls of the waveguide 52 are plated with a low bulk resistivity metal. In addition, although not shown in FIGS. 3A and 3B, waveguide 52 may be connected to an antenna, dielectric coupling lens, or other electronic components to provide the functionality described herein.

In the example of FIG. 3A, 3D GRIN lens 54 may include, a GRIN lens produced using the techniques described herein. In some examples, 3D GRIN lens 54 may have a dielectric profile or relative permittivity and functionality, such as for providing a similar focusing effect on electromagnetic waves 56 as a conventional biconvex GRIN lens would, but with a different physical structure and form factor. For example, 3D GRIN lens 54 may be flat, curved, or any contour, shape, and/or size available to additive manufacturing while still producing a similar focusing effect as a conventional GRIN lens, such as a biconvex lens, because of the similar dielectric profile. In other examples, 3D GRIN lens 54 may improve bandwidth as compared to a conventional convex lens, such as providing functionality over a greater frequency span by a reduction in chromatic aberrations.

In yet other examples, 3D GRIN lens 54 may have flat contours which can be easier to attach and mount to other physical objects. In some examples, 3D GRIN lens 54 may be designed to pass a gas or liquid through one of the dielectric materials in its structure, a feature that may not be possible with a solid biconvex GRIN lens having a single dielectric material with a signal dielectric constant throughout the lens. In other examples, 3D GRIN lens 54 may be designed with a specific porosity to filter gas or liquid through one of the dielectric materials in its structure, a feature that may not be possible with a solid biconvex GRIN lens. In some examples, a size of voids within 3D GRIN lens 54 may be controlled by an additive manufacturing process to meet specific filtering requirements. In yet other examples, 3D GRIN lens 54 may be used to create non-reflective coatings and/or layers. In some examples, 3D GRIN lens 54 may enable polar selectivity based on the construction of the two or more dielectric materials. In other examples, 3D GRIN lens 54 may be created by AM device 24 with a range of print materials with an associated range of dielectric constants. In some examples, it may be beneficial to use only a single (or small number of) 3D printing material, printed with a controlled density to vary the dielectric constant in a controlled manner. In some examples, the thickness of each layer of 3D GRIN lens 54 may be relatively small compared to the wavelength of a specific frequency. In other examples, the thickness of each layer may be smaller than a wavelength, such as a thickness between $1/10$ and $1/15$ of a wavelength of a desired frequency. In yet other examples, the desired frequency may be 60 GHz. In some examples, the volumetric ratio of the first dielectric material to the second dielectric material in the respective volume elements is controlled by a line width of the first dielectric material formed by the additive manufacturing process. In other examples, 3D GRIN lens 54 may have a first dielectric material of a thermoplastic resin or a photo-reactive resin. In other examples, 3D GRIN lens 54 may have a second dielectric material of air or at least one of a thermoplastic resin or photo-reactive resin.

In the example of FIG. 3B, electromagnetic waves 56 may include extremely high frequency electromagnetic waves, such as electromagnetic waves having a frequency of approximately 60 GHz. In some implementations of FIGS. 3A & 3B, waveguide 52 transmits electromagnetic waves 56 that pass through 3D GRIN lens 54 in order to focus electromagnetic waves 56 at point 58. In other implementations of FIGS. 3A & 3B, waveguide 52 receives electromagnetic waves 56 that pass through 3D GRIN lens 54 in order to focus electromagnetic waves 56 into waveguide 52.

In some examples, 3D GRIN lens 54 may be useful in the millimeter wave band of the electromagnetic spectrum. In some examples, 3D GRIN lens 54 may be used with signals at frequencies ranging from 10 GHz to 120 GHz, for example. In other examples, 3D GRIN lens 54 may be used with signals at frequencies ranging from 10 GHz to 300 GHz, for example. 3D GRIN lens 54 could be used in a variety of systems, including, for example, low cost cable markets, contactless measurement applications, chip-to-chip communications, and various other wireless point-to-point applications that offer fiber data rates and can support dense deployment architectures.

Figure 4:
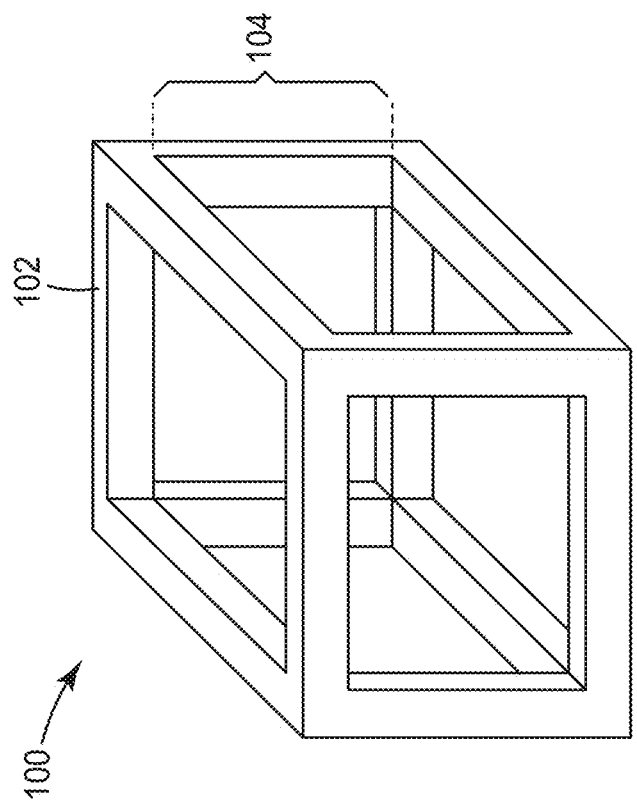
FIG. 4 is a diagram illustrating an example of a conceptual three-dimensional unit cell with a respective volume of a first dielectric material and a second dielectric material.

FIG. 4 is a diagram illustrating an example of a conceptual three-dimensional unit cell 100 with a volume of first dielectric material 102 and a volume of a second dielectric material 104. In the example of FIG. 4, unit cell 100 includes two different dielectric materials 102, 104 each with their own respective volume and respective dielectric constant. In one example, unit cell 100 may have a structure defining a volume of dielectric material 102 (e.g., a photo-reactive resin) having a dielectric constant of 2.8. In another example, unit cell 100 may have another structure, such as a void, with a second dielectric material 104 defining a volume (e.g., air) having a dielectric constant of 1 within the unit cell 100. The effective dielectric constant of unit cell 100 is a function of the respective volumes of the two dielectric materials 102, 104. In other examples, unit cell 100 may be any shape available to AM device 24, as described in FIG. 1, such as a box, sphere, or rectangle. In some examples, unit cell 100 may represent a voxel. In other examples, unit cell 100 may represent a plurality of voxels.

In one example implementation, unit cell 100 may be laid down repeatedly by an additive manufacturing process to fill the GRIN lens volume such as with the voxel by voxel or layer by layer approach as described in FIG. 1. In another example implementation, if structures of unit cell 100 of FIG. 4 are significantly small relative to the wavelength of the wave being manipulated, then the structure will function as a single homogeneous material with an effective dielectric constant between the two dielectric constants (e.g. air and 3D printing material), based on the volumetric ratios of the two materials and the voxel geometry. In some examples, the first dielectric material may be loaded with low loss high dielectric material to further expand the range of RF optical applications of additive manufacturing of 3D GRIN lenses.

Figure 5:
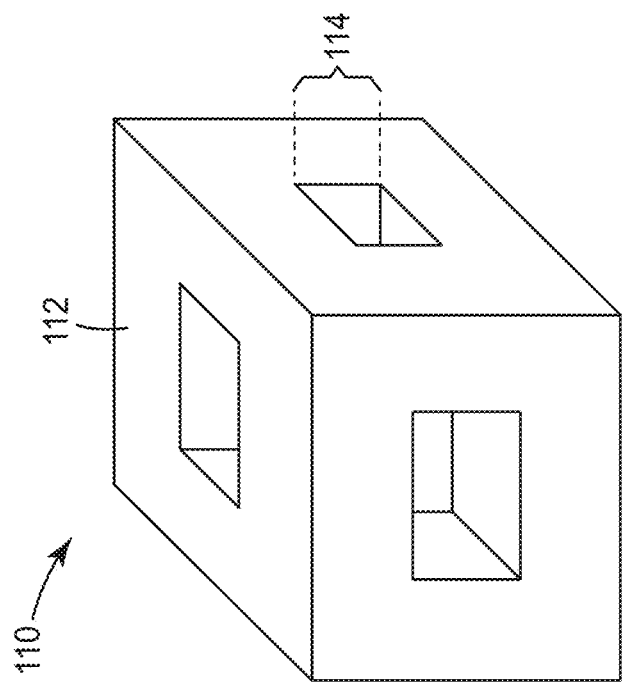
FIG. 5 is a diagram illustrating another example of a conceptual three-dimensional unit cell with a respective volume of a first dielectric material and a second dielectric material.

FIG. 5 is a diagram illustrating another example of a conceptual three-dimensional unit cell 110 with a volume of first dielectric material 112 and a volume of second dielectric material 114. In some examples, the dielectric materials 112, 114 of FIG. 5 may be the same dielectric materials as dielectric materials 102, 104 (FIG. 4), respectively. In the example of FIG. 5, unit cell 110 includes two different dielectric materials 112, 114 each with their own respective volume and respective dielectric constant. In one example, unit cell 110 may be structured as a unit cell with a first dielectric material 112 (e.g., a photo-reactive resin) having a dielectric constant of 2.8. In another example, unit cell 110 may include a void with a second dielectric material 114 defining a volume having a dielectric constant of 1 within the box of dielectric material 112. The effective dielectric constant of unit cell 110 is defined by a function of the respective volumes of the two dielectric materials 112, 114. In other examples, unit cell 110 may be any shape available to AM device 24, as described in FIG. 1, such as a box, sphere, or rectangle. In another example of FIG. 5, unit cell 110 may have more of a first dielectric material 112 than a second dielectric material 114, unlike unit cell 100 of FIG. 4 where the first dielectric material 102 has less volume than the second dielectric material 104. In some examples, the effective dielectric constant of unit cell 110 is higher than the effective dielectric constant of unit cell 100 because unit cell 110 has a higher ratio of dielectric constant material than unit cell 100. In some examples, unit cell 110 may represent a voxel. In other examples, unit cell 110 may represent a plurality of voxels.

In one example implementation, unit cell 110 may be repeated to fill the GRIN lens volume, such as the voxel by voxel or layer by layer approach as described in FIG. 1. In another example implementation, if structures of unit cell 110 of FIG. 5 are significantly small relative to the wavelength of the wave being manipulated, then the structure will function as a single homogeneous material with an effective dielectric constant between the two dielectric constants (e.g. air and 3D printing material), based on the volumetric ratios of the two dielectric materials and the voxel geometry. In some examples, the first dielectric material may be loaded with low loss high dielectric material to further expand the range of RF optical applications of additive manufacturing of 3D GRIN lenses.

Figure 6:
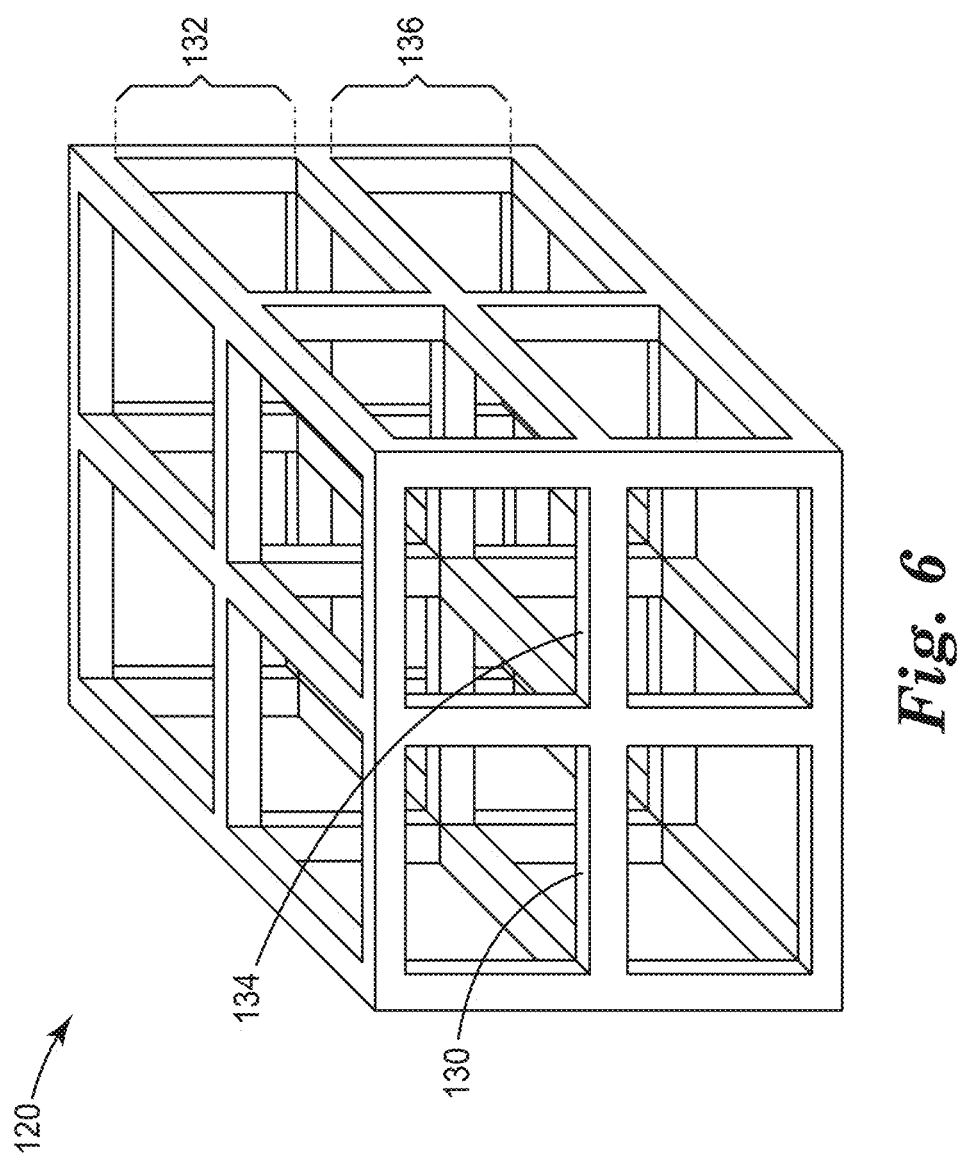
FIG. 6 is a diagram illustrating an example of an array of conceptual three-dimensional unit cells with a volume based on the respective volumes of each three-dimensional unit cell in the array of three-dimensional unit cells.

FIG. 6 is a diagram illustrating an example of an array of conceptual three-dimensional unit cells with a volume based on the respective volumes of each three-dimensional unit cell in the array of three-dimensional unit cells. In some examples, dielectric materials 130, 132, 134, 136 of FIG. 6 may correspond to one or more of dielectric materials 102, 104, 112, 114 of FIGS. 4-5. In the example of FIG. 6, unit cell 120 includes two different dielectric materials, such as a first dielectric material and a second dielectric material, each with a respective volume and respective dielectric constant. In one example, array of unit cells 120 may have a structure, such as a box, and a volume defined by a first dielectric material 130, 134 (e.g., a photo-reactive resin) having a dielectric constant of 2.8. In another example, may have a structure, such as a void, and a volume defined by a second dielectric material 132, 136 having a dielectric constant of 1. The effective dielectric constant of array of unit cells 120 is defined by a function of the respective volumes of the dielectric materials 130, 132, 134, 136. In other examples, array of unit cells 120 may be any shape available to AM device 24, as described in FIG. 1, such as a sphere, rectangle, cylinder, or tetrahedron. In another example of FIG. 6, array of unit cells 120 may have one unit cell with more volume of a first dielectric material 130 than a volume of a second dielectric material 132, such as unit cell 110 as described in FIG. 5. In some examples, the effective dielectric constant of unit cell 110, as described in FIG. 5, is higher than the effective dielectric constant of unit cell 100 because unit cell 110 has a higher ratio of the higher dielectric constant material than unit cell 100. In some examples, array of unit cells 120 may comprise an array of voxels. In other examples, array of unit cells 120 may have an effective dielectric constant as a function of the respective volumes of the one or more dielectric materials in the array of unit cells.

In one example implementation, array of unit cells 120 may be laid down repeatedly by additive manufacturing to fill the GRIN lens volume, such as the voxel by voxel or layer by layer approach as described in FIG. 1. In another example implementation, if the unit cells in the array of unit cells 120 of FIG. 6 are significantly small relative to the wavelength of the wave being manipulated, then the structure may function as a single homogeneous material with an effective dielectric constant between the two dielectric constants (e.g. air and 3D printing material), based on the volumetric ratios of the two dielectric materials and the voxel geometry. In some examples, the first dielectric material may be loaded with low loss high dielectric material to further expand the range of RF optical applications of additive manufacturing of 3D GRIN lenses. In other examples, array of unit cells 120 may be referred to as a grid pattern. In some examples, the volumetric ratio of the first dielectric material to the second dielectric material in the respective volume elements is controlled by a line width of the first dielectric material formed by the additive manufacturing process.

Figure 7:
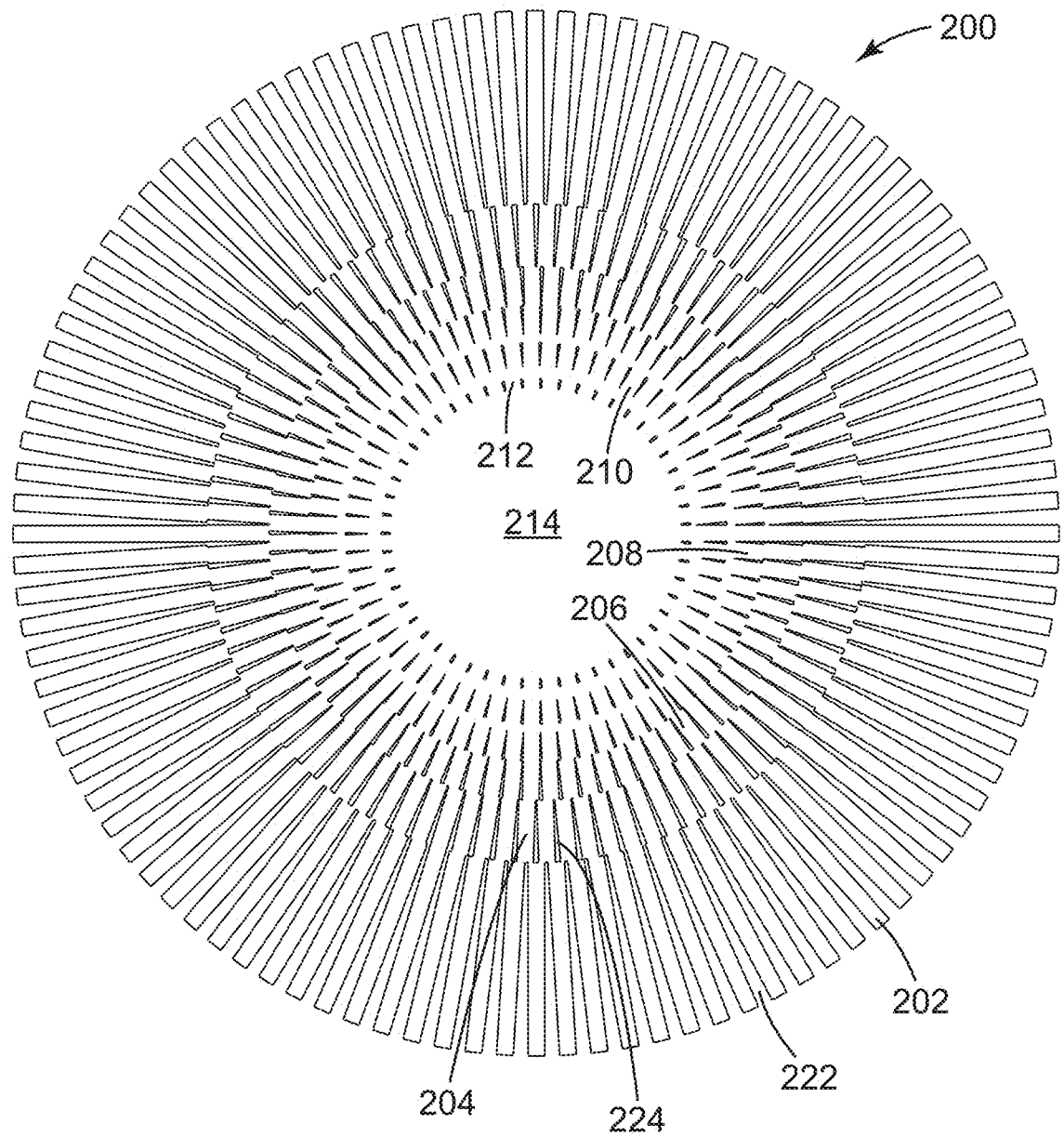
FIG. 7 is a diagram illustrating an example of an array of digital three-dimensional voxels structured in a spoke design.

FIG. 7 is a diagram illustrating an example of an array of digital three-dimensional voxels structured in spoke design 200. In the example of FIG. 7, the spoke design 200 includes spoke rings, voids, and a circle, such as spoke rings 202-212, circle 214, and voids 222-224. Spoke rings 202-212 may consist of a first dielectric material (e.g., photo-reactive resin) with an associated dielectric constant of 2.8. Voids 222-224 may be similar to spoke rings 202-214, such that voids 222-224 are comprised of a second dielectric material (e.g., air) with an associated dielectric constant of 1.

In one example implementation of spoke design 200, spoke ring 202 has the lowest ratio of first dielectric material (e.g., photo-reactive resin) to void 222 comprised of second dielectric material (e.g., air). In other examples, each subsequent spoke ring, such as spoke rings 204-212, has a higher ratio of the first dielectric material to the void comprised of a second dielectric material. That is, in one example, an outer spoke ring 212 has the highest ratio of first dielectric material to the second dielectric material. Moreover, in one example of FIG. 7, circle 214 may be formed of one solid dielectric material, such as the first dielectric material.

In some examples of FIG. 7, spoke rings 202-212, circle 214, and voids 222-224 each may have a plurality of effective dielectric constants corresponding to an overall dielectric profile for spoke design 200. In one example, spoke rings 202-212 and circle 214 have an effective dielectric constant based on the volume of the first dielectric material, and voids 222-224 may have an effective dielectric constant based on the second dielectric material. In some examples, spoke rings 202-212 may have an effective constant based on the volumes of one or more dielectric materials. In other examples, circle 214 may have an effective dielectric constant based on one or more dielectric materials. In yet other examples, voids 222-224 may have an effective dielectric constant based on one or more dielectric materials. In some examples of spoke design 200 of FIG. 7, the plurality of effective dielectric constants for the spoke rings, circle, and voids may comprise an overall dielectric profile similar to a dielectric profile of GRIN lens, such as a biconvex lens. In some examples implementations, spoke design 200 may have one or more layers with an overall diameter as a function of the wavelength of the waves being focused. For example, spoke design 200 may have one or more layers with a diameter of 10 wavelengths, such as 50 mm equivalent to 10 wavelengths at 60 GHz. In some examples, spoke design 200 may be referred to as a spoke pattern. In other examples, the volumetric ratio of the first dielectric material to the second dielectric material in the respective volume elements is controlled by a line width of the first dielectric material formed by the additive manufacturing process.

Figure 8:
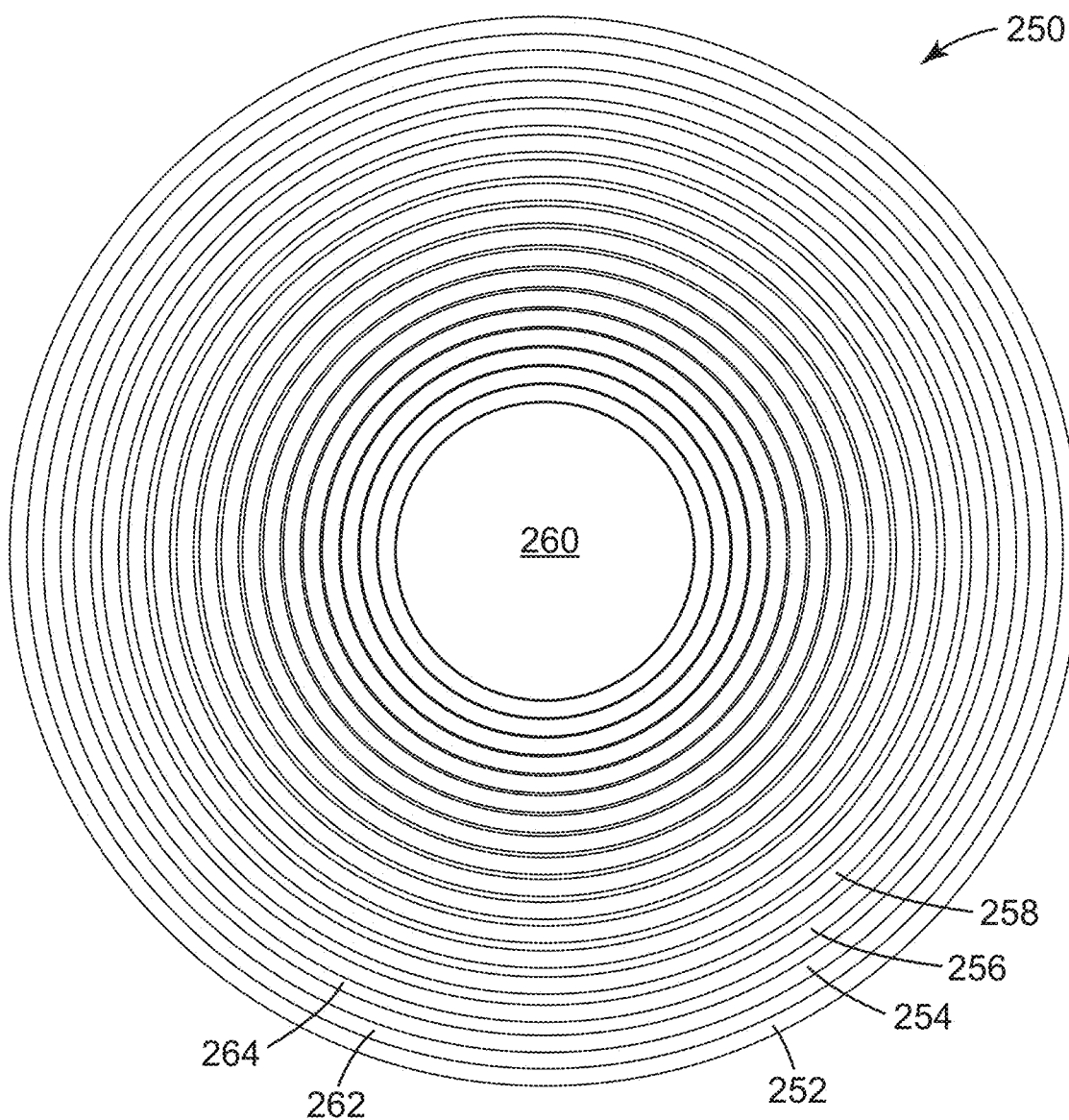
FIG. 8 is a diagram illustrating another example of an array of digital three-dimensional voxels structured in a ring design.

FIG. 8 is a diagram illustrating another example of an array of digital three-dimensional voxels structured in ring design 250. In the example of FIG. 8, the ring design includes rings 252-258, circle 260, and voids 262-264. Rings 252-258 may consist of a different ratio of dielectric materials (e.g., photo-reactive resin and air) structured in a ring design. Voids 262-264 may be similar to rings 252-258, such that voids 262-264 may consist of a different ratio of dielectric materials in a ring design (not shown). For example, ring 252 has the lowest ratio of first dielectric material (e.g., photo-reactive resin) and the second dielectric material (e.g., air) because ring 252 has the greatest diameter and is adjacent to void 262 with the largest volume of second dielectric material (e.g., air). In other examples, each subsequent ring, such as rings 254-258, has a higher ratio of the first dielectric material to the second dielectric material. That is, in one example, ring 252 has the highest ratio of first dielectric material to the second dielectric material. Moreover, in one example of FIG. 8, circle 260 has one dielectric material, such as the first dielectric material (e.g., photo-reactive resin), and voids 262-264 may have one dielectric material, such as the second dielectric material (e.g., air).

In some examples of FIG. 8, the first dielectric material has a dielectric constant of 2.8 and the second dielectric material has a dielectric constant of 1. Rings 252-258, circle 260, and voids 262-264 each have an effective dielectric constant as part of a dielectric profile for ring design 250. In one example, rings 252-258 may have an effective dielectric constant based on the volumes of the first and second dielectric materials, circle 260 may have an effective dielectric constant based on the first dielectric material, and voids 262-264 may have an effective dielectric constant based on the second dielectric material. In some examples, rings 252-258 may have an effective constant based on the volumes of two or more dielectric materials. In other examples, circle 260 may have an effective dielectric constant based on one or more dielectric materials. In yet other examples, voids 262-264 may have an effective dielectric constant based on one or more dielectric materials. In some examples of ring design 250 of FIG. 8, the effective dielectric constants for the rings, circle, and voids may together form an overall dielectric profile similar to a GRIN lens, such as a biconvex lens. In some examples, ring design 250 may be referred to as a ring pattern. In other examples, the volumetric ratio of the first dielectric material to the second dielectric material in the respective volume elements is controlled by a line width of the first dielectric material formed by the additive manufacturing process.

Figure 9A:
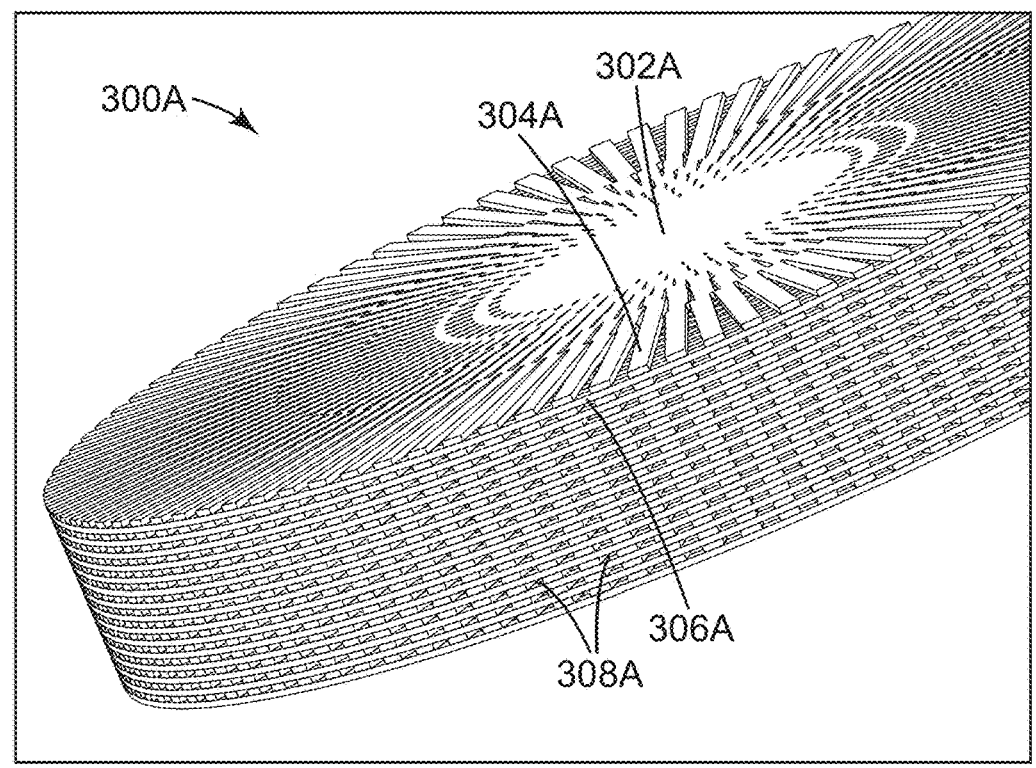
FIGS. 9A-9B are diagrams illustrating examples of an array of digital three-dimensional voxels structured in a combination of the spoke design and the ring design to form a spoke and ring design and a ring and spoke design.
Figure 9B:
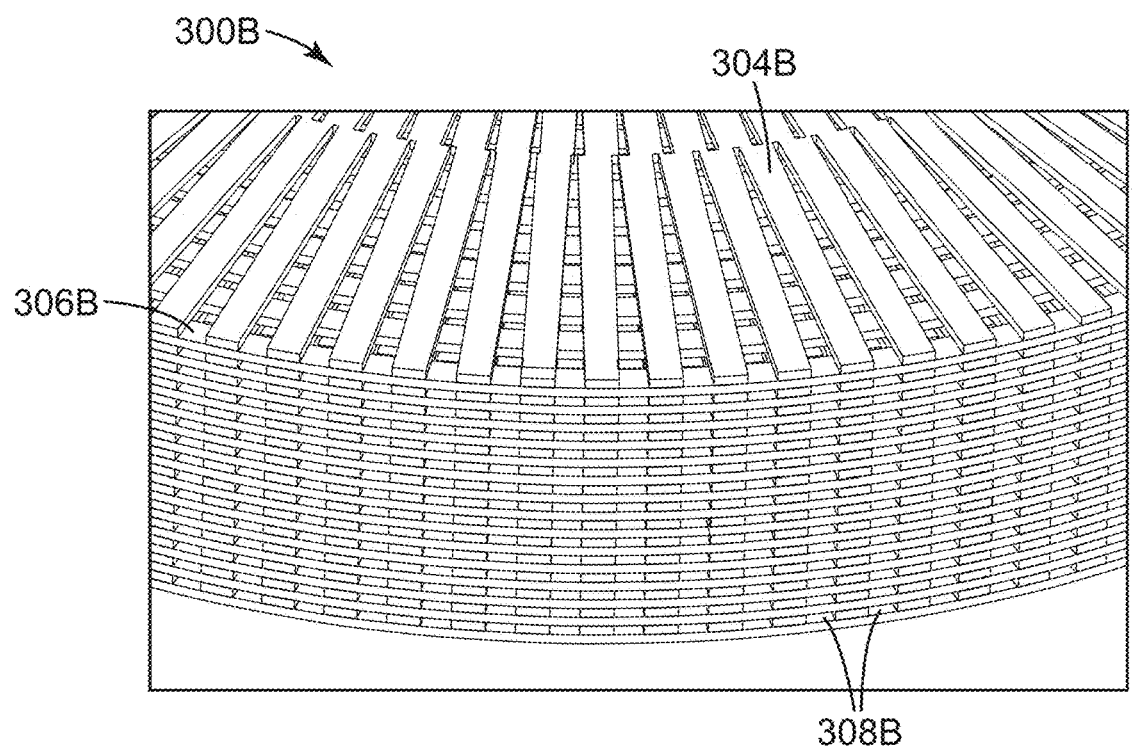

FIGS. 9A-9B are diagrams illustrating examples of an array of digital three-dimensional voxels structured in a combination of spoke design 200 and ring design 250 to form spoke and ring design 300A and ring and spoke design 300B. In some examples of FIGS. 9A & 9B, some reference numerals may be described in accordance with FIGS. 7-8. In some examples of spoke and ring design 300A and the ring and spoke design 300B, the GRIN lens may be constructed with an alternating layer of ring layers and spoke layers to reduce its sensitivity to the polarization of an EM wave. In other examples of FIGS. 9A & 9B, designs 300A, 300B may alternate 15 spoke layers with 15 ring layers. In yet other examples, designs 300A, 300B may have a plurality of spoke layers alternating with ring layers. In some examples, the thickness of each layer may be small relative to the wavelength. In the spoke and ring design 300A and the ring and spoke design 300B the thickness of each layer may be between 1/10 to 1/15 of a wavelength thick at 60 GHz. In free space a wavelength at 60 GHz is 5 mm, but in a material with a relative dielectric constant of 2.8, the wavelength is 5 mm/squareroot (2.8). In some examples, designs 300A, 300B may interleave 15 spoke layers with 15 ring layers to achieve a thickness of 7.8 mm.

In the example of FIG. 9A, the array of three-dimensional voxels 300A includes ring layers, spoke layers, voids, and a circle, such as ring layer 306A, spoke layer 304A, void 308A, and circle 302A. Ring layer 306A, spoke 304A, and void 308A may consist of a different volume of one or more dielectric materials (e.g., photo-reactive resin and air) structured in the spoke and ring design. For example, ring layer 306A has the lowest ratio of first dielectric material (e.g., photo-reactive resin) to second dielectric material (e.g., air), as void 308A has the largest volume at the edge of spoke and ring design 300. In other examples, each subsequent ring has a higher ratio of the first dielectric material to the second dielectric material because the volume of in the voids gets smaller towards circle 302A. That is, in one example, the ring closest to the center has the highest ratio of first dielectric material to the second dielectric material. Moreover, in one example of FIG. 9A, circle 302A has one dielectric material, such as the first dielectric material (e.g., photo-reactive resin).

In some examples of FIG. 9A, the first dielectric material has a dielectric constant of 2.8 and the second dielectric material has a dielectric constant of 1. The plurality of rings, spokes, voids, and circle including ring layer 306A, spoke 304A, void 308A, and circle 302A each have an effective dielectric constant as part of an overall dielectric profile for spoke and ring design 300A. In one example, rings, spokes, and voids have an effective dielectric constant based on the volumes of the first and second dielectric materials, and circle 302A has an effective dielectric constant based on the first dielectric material. In some examples, ring, spokes, and voids have an effective constant based on the volumes of two or more dielectric materials. In other examples, circle 302A has an effective dielectric constant based on one or more dielectric materials. In some examples of spoke and ring design 300A of FIG. 9A, the effective dielectric constants for the spokes, rings, circle, and voids may have an overall dielectric profile similar to a GRIN lens, such as a biconvex lens.

In the example of FIG. 9B, the array of three-dimensional voxels 300B includes an enhanced view of rings, spokes, voids, and a circle, such as ring layer 306B, spoke 304B, and void 308B. In some examples of the ring and spoke design 300B, the GRIN lens may be constructed with an alternating layer of spoke layers and ring layers to reduce its sensitivity to the polarization of an EM wave. Ring layer 306B, spoke 304B, and void 308B may consist of a different volume of one or more dielectric materials (e.g., photo-reactive resin and air) structured in the ring and spoke design 300B. For example, ring layer 306B has the lowest ratio of first dielectric material (e.g., photo-reactive resin) to second dielectric material (e.g., air), as void 308B has the largest volume at the edge of ring and spoke design 300B. In other examples, each subsequent ring has a higher ratio of the first dielectric material to the second dielectric material because the volume of the voids gets smaller towards the center of ring and spoke design. That is, in one example, ring layer 306B has the lowest ratio of first dielectric material to the second dielectric material.

In some examples of FIG. 9B, the first dielectric material has a dielectric constant of 2.8 and the second dielectric material has a dielectric constant of 1. The plurality of rings, spokes, and voids including ring layer 306B, spoke 304B, and void 308B each have an effective dielectric constant as part of an overall dielectric profile for the ring and spoke design 300B. In one example, rings, spokes, and voids have an effective dielectric constant based on the volumes of the first and second dielectric materials. In some examples, ring, spokes, and voids have an effective constant based on the volumes of two or more dielectric materials. In some examples of the ring and spoke design 300B of FIG. 9B, the effective dielectric constants for the spokes, rings, circle, and voids may have an overall dielectric profile similar to a GRIN lens, such as a biconvex lens.

Figure 10:
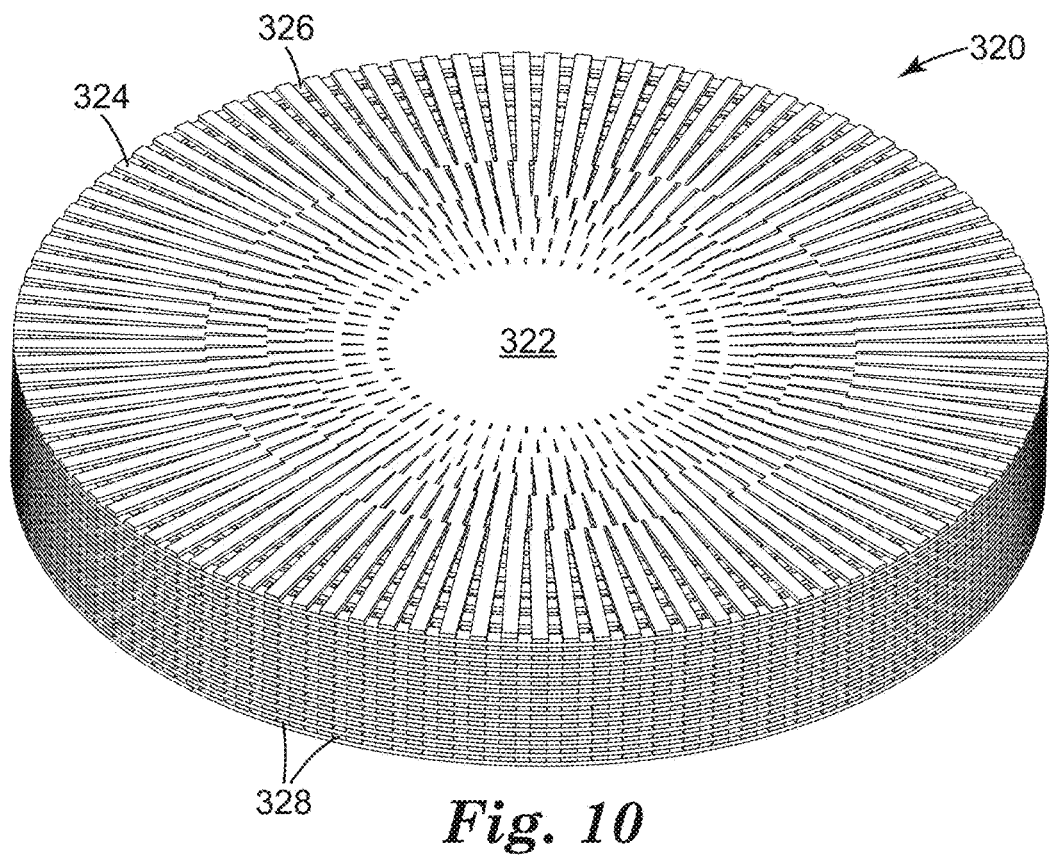
FIG. 10 is a diagram illustrating an example of an array of physical three-dimensional voxels structured in a spoke and ring design.

FIG. 10 is a diagram illustrating an example of an array of physical three-dimensional voxels structured in a spoke and ring design 320. In some examples of FIG. 10, some reference numerals may be described with respect to FIGS. 7-9B.

In the example of FIG. 10, the array of three-dimensional voxels of the spoke and ring design 320 includes ring layers, spoke ring layers, voids, and a center, such as ring layer 326, spoke ring layer 324, void 328, and center 322. In the example of FIG. 10, the top layer of spoke and ring design 320 is a spoke ring layer, such as spoke ring design 200 as described by FIG. 7. In some examples of the spoke and ring design 320, as depicted in FIG. 10 the GRIN lens may be constructed with an alternating layer of ring layers and spoke layers to reduce its sensitivity to the polarization of an EM wave. In some examples, the spoke and ring design 320 may have a diameter based on a given wavelength of an electromagnetic wave. In other examples, the spoke and ring design 320 may interleave 15 spoke layers with 15 ring layers to achieve a thickness of 7.8 mm, and diameter of 50 mm or approximately 10 wavelengths of a 60 GHz wave which has a full wavelength of approximately 5 mm.

In one example implementation of 3D GRIN lens 320, ring layer 326, spoke ring layer 324, and void 328 may each have a different volume of one or more dielectric materials (e.g., photo-reactive resin and air) structured in the spoke and ring design 320. For example, ring layer 326 has the lowest ratio of a first dielectric material (e.g., photo-reactive resin) to a second dielectric material (e.g., air), as the voids, such as void 328 has the largest volume of second dielectric material at the edge of the spoke and ring design 320.

In other examples, each ring in ring layer 326 closer to center 322 may have a higher ratio of the first dielectric material to the second dielectric material because the volume of the second dielectric material in the voids decreases towards center 322. That is, in one example, the ring of ring layer 326 closest to center 322 has the highest ratio of the first dielectric material to the second dielectric material. In some examples, each ring of spokes in spoke layer 324 closer to center 322 may have a higher ratio of the first dielectric material to the second dielectric material because the volume of the second dielectric material in the voids, such as void 328, decreases towards center 332. That is, in one example, the ring of spokes in spokes layer 324 closest to center 322 has the highest ratio of the first dielectric material to the second dielectric material. Moreover, in one example of FIG. 10, center 322 may comprise one dielectric material, such as the first dielectric material (e.g., photo-reactive resin). In some examples, the spoke and ring design 320 comprises a dielectric profile of a biconvex GRIN lens.

Figure 11:
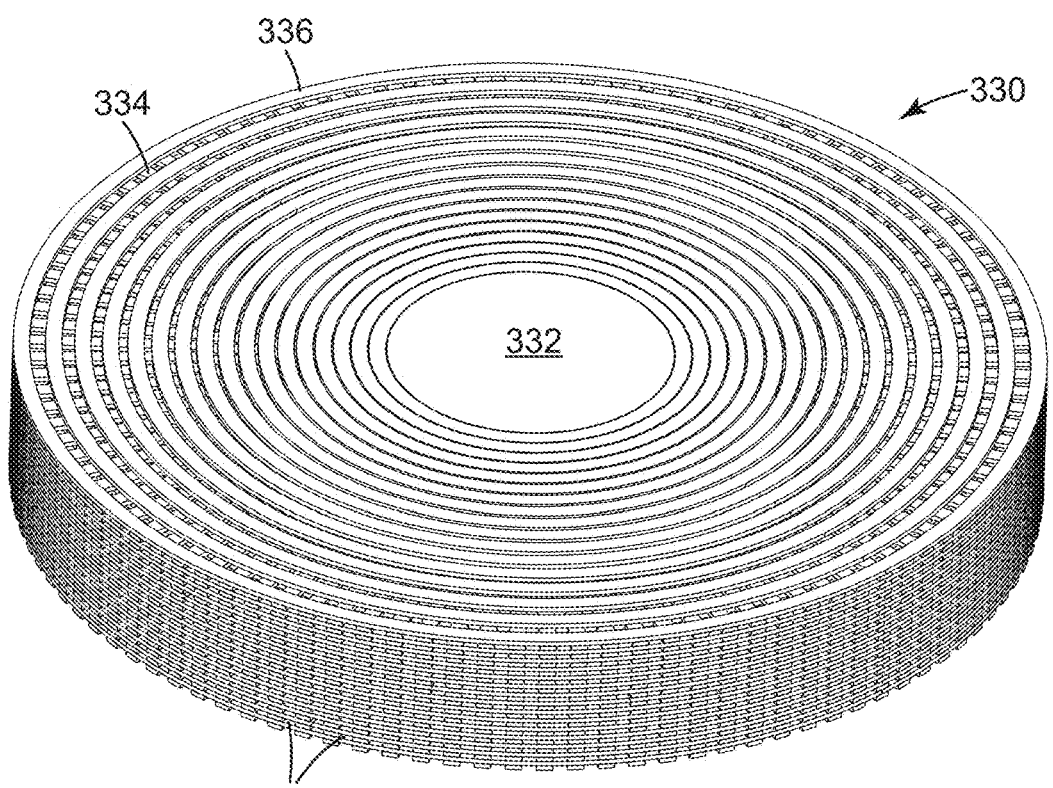
FIG. 11 is a diagram illustrating an example of an array of physical three-dimensional voxels structured in a ring and spoke design.

FIG. 11 is a diagram illustrating an example of a structure with an array of physical three-dimensional voxels in a ring and spoke design 330. In some examples of FIG. 11, some reference numerals may be described with respect to FIGS. 7-10.

In the example of FIG. 11, the array of three-dimensional voxels of the ring and spoke design 330 includes ring layers, spoke layers, voids, and a center, such as ring layer 336, spoke layer 334, void 338, and center 332. In the example of FIG. 11, the top layer of the ring and spoke design 330 is a ring layer, such as ring design 250 as described by FIG. 8. In some examples of ring and spoke design 330, as depicted in FIG. 11 the GRIN lens may be constructed with an alternating layer of ring layers and spoke layers to reduce its sensitivity to the polarization of an EM wave. In some examples, the ring and spoke design 330 may have a diameter based on given wavelength of an electromagnetic wave. In other examples, the ring and spoke design 330 may interleave 15 spoke layers with 15 ring layers to achieve a diameter of 50 mm or approximately 10 wavelengths of a 60 GHz wave, which has a full wavelength of approximately 5 mm.

In one example implementation of the ring and spoke design 330, ring layer 336, spoke layer 334, and void 338 may each have a different volume of one or more dielectric materials (e.g., photo-reactive resin and/or air) structured in the ring and spoke design 330. For example, ring layer 336 has the lowest ratio of a first dielectric material (e.g., photo-reactive resin) to a second dielectric material (e.g., air), as the voids, such as void 338 has the largest volume of second dielectric material at the edge of ring and spoke design 330.

In other examples, each ring in ring layer 336 closer to center 332 may have a higher ratio of the first dielectric material to the second dielectric material because the volume of the second dielectric material in the voids decreases towards center 332. That is, in one example, the ring in ring layer 336 closest to center 332 has the highest ratio of the first dielectric material to the second dielectric material. In some examples, each ring of spokes in spoke layer 334 closer to center 332 may have a higher ratio of the first dielectric material to the second dielectric material because the volume of the dielectric material in the voids decreases towards center 332. That is, in one example, the ring of spokes in spokes layer 334 closest to center 332 has the highest ratio of the first dielectric material to the second dielectric material. Moreover, in one example of FIG. 11, center 332 may comprise one dielectric material, such as the first dielectric material (e.g., photo-reactive resin). In some examples, the ring and spoke design 330 comprises a dielectric profile of a biconvex GRIN lens.

Figure 12:
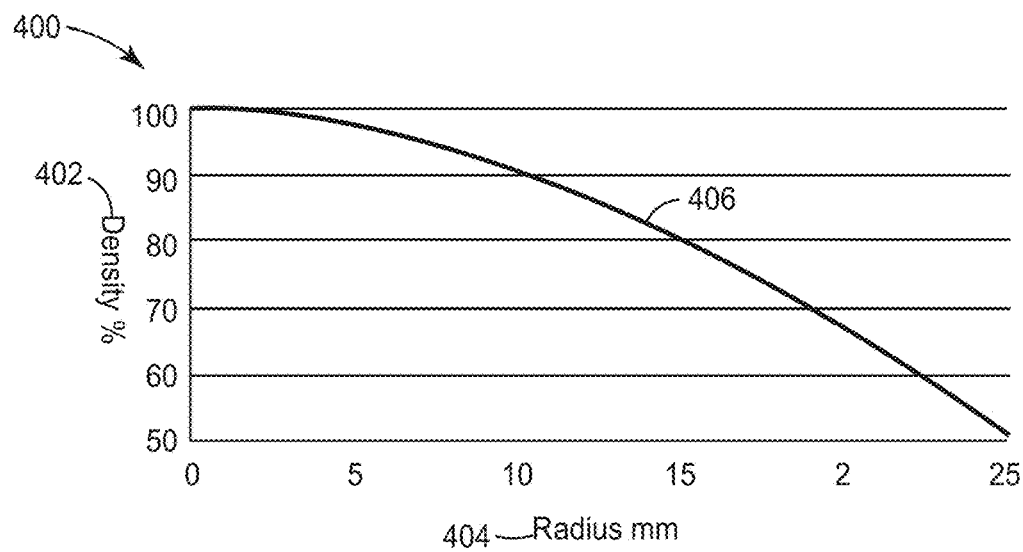
FIG. 12 is a graph illustrating an example of the density of a first dielectric material according to the radius of a 3D GRIN lens.

FIG. 12 is a graph illustrating an example of the desired density of a first dielectric material according to the radius of a 3D GRIN lens. In the example of FIG. 12, density 402 decreases as represented by line 406 from a density of approximately 100% at 0 mm of radius 404 to approximately 50% at 25 mm of radius 404, as depicted in FIG. 12. Density 402 is a function of the volume of the first and second dielectric material along radius 404 of a 3D GRIN lens. Radius 404 is a function of the dimensions of a GRIN lens. Line 406, in one example, represents the approximate dielectric profile of a biconvex lens.

Using equation 1, the index of refraction, n, for a radial graded lens with a focal length f and a thickness t is calculated and shown in Table 1 below with a focal length of 25 mm and a thickness of 7.5 mm. Where $\Delta n = n_{xo} - n_x$ ($n_{xo}$ and $n_x$ are the refractive indexes in position $x_o$ and $x$ respectively), and $\Delta x = x - x_o$.

$$\Delta n = \frac{\sqrt{f^2 + \Delta x^2} - f}{t} \quad (1)$$

TABLE 1

| Radius | delta n | n effective | % density |
|---|---|---|---|
| 0 | 0 | 2.80 | 100 |
| 1 | 0.002666 | 2.80 | 100 |
| 2 | 0.01065 | 2.79 | 100 |
| 3 | 0.023914 | 2.78 | 99 |
| 4 | 0.042397 | 2.76 | 98 |
| 5 | 0.066013 | 2.73 | 98 |
| 6 | 0.094656 | 2.71 | 97 |
| 7 | 0.128201 | 2.67 | 95 |
| 8 | 0.166508 | 2.63 | 94 |
| 9 | 0.209421 | 2.59 | 93 |
| 10 | 0.256777 | 2.54 | 91 |
| 11 | 0.3084 | 2.49 | 89 |
| 12 | 0.364113 | 2.44 | 87 |
| 13 | 0.423734 | 2.38 | 85 |
| 14 | 0.48708 | 2.31 | 83 |
| 15 | 0.553968 | 2.25 | 80 |
| 16 | 0.624219 | 2.18 | 78 |
| 17 | 0.697658 | 2.10 | 75 |
| 18 | 0.774112 | 2.03 | 72 |
| 19 | 0.853418 | 1.95 | 70 |
| 20 | 0.935416 | 1.86 | 67 |
| 21 | 1.019954 | 1.78 | 64 |
| 22 | 1.106887 | 1.69 | 60 |
| 23 | 1.196077 | 1.60 | 57 |
| 24 | 1.287393 | 1.51 | 54 |
| 25 | 1.380712 | 1.42 | 51 |

The columns of Table 1 include delta n, n effective, and percent density versus radius. In the example implementation, Table 1 assumes that the nominal relative dielectric constant of the first dielectric material, such as bulk 3D print material is 2.8. Moreover, Table 1 assumes that the nominal relative dielectric constant of the second dielectric material, such as a vacuum, is 0. In other example implementations, the nominal relative dielectric constant of the first dielectric material (e.g., bulk 3D print material) is 2.8 and the nominal relative dielectric constant of the second dielectric material (e.g., air) is 1. The table entries that are highlighted are the dielectric constants that were used in the stepped dialectic constant GRIN lens model depicted in FIG. 15, with simulation results shown below. In practice the dielectric constant does not need to be stepped, but can be varied in a more continuous manner.

Figure 13A:
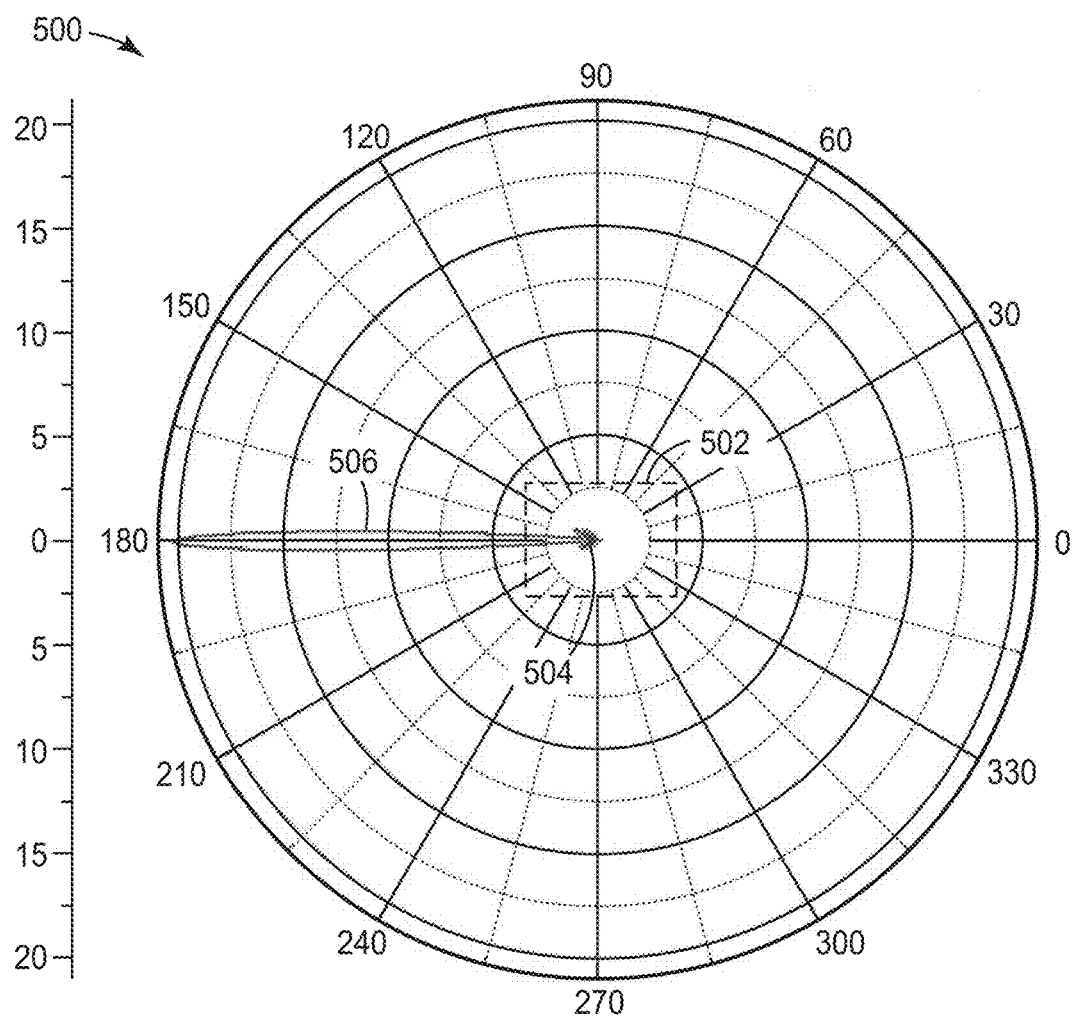
FIGS. 13A-13B are graphs illustrating an example of the measured gain patterns without a GRIN lens and with a GRINS lens as described in FIGS. 10-11.
Figure 13B:
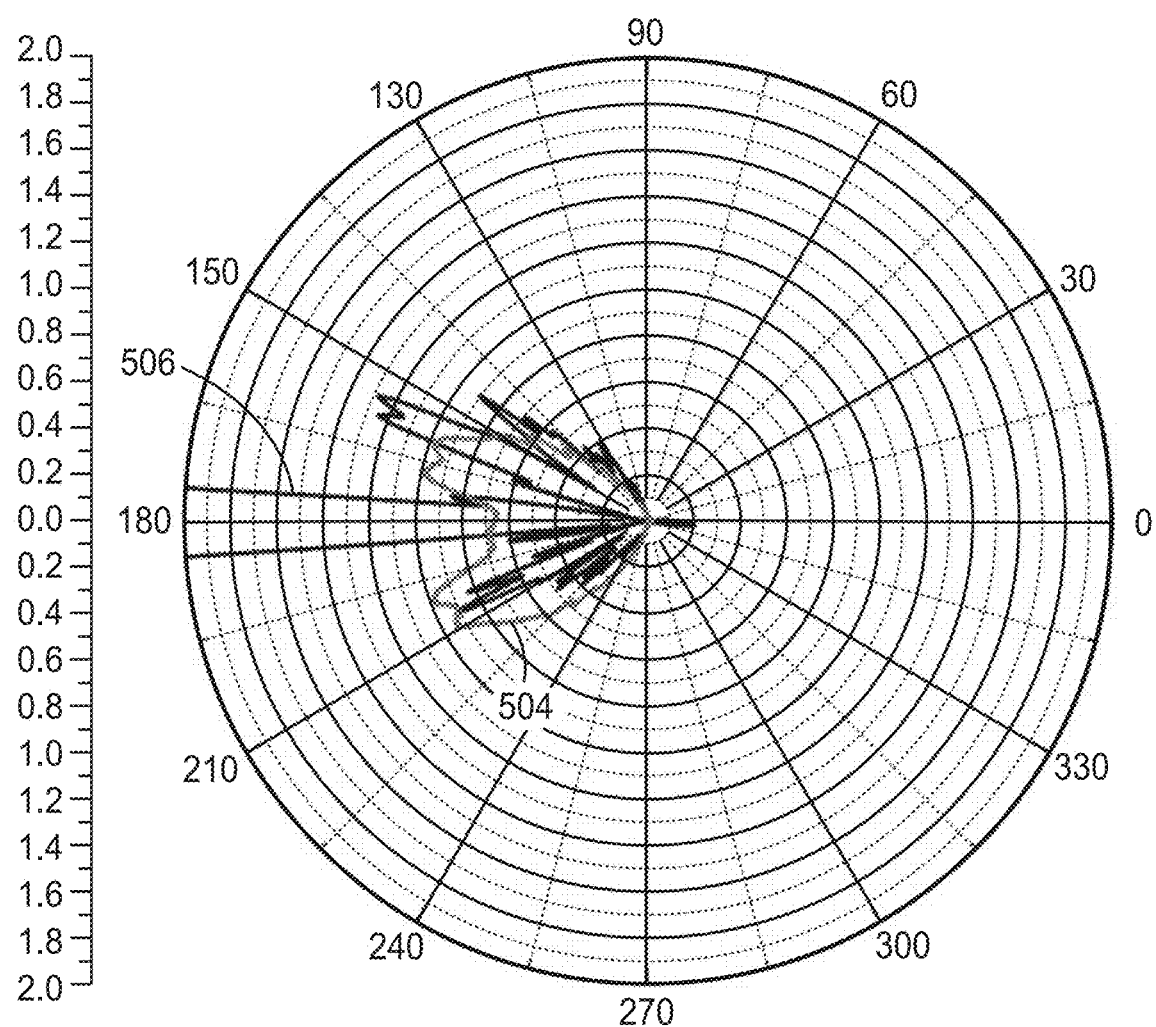

FIGS. 13A & 13B are graphs illustrating an example of the measured gain patterns without a GRIN lens and with a GRINS lens as described in FIGS. 10 and 11. In the example of FIGS. 13A & 13B, graphs 500 and 502 include the measured gain patterns 504 and 506.

Measured gain pattern 504 represents a 360° measured gain pattern of 60 GHz waves radiated from a flange in a waveguide, such as waveguide 54 as described in FIG. 3, without a GRIN lens to focus the 60 GHz waves. Measured gain pattern 504 is normalized to unity. In some examples, the flange of the waveguide, such as waveguide 52, may have an opening of 3.8 mm by 1.9 mm wide. Measured gain pattern 506 represents a 360° measured gain pattern of 60 GHz waves produced by a waveguide, such as waveguide 52 as described in FIG. 3, with a GRIN lens according to the techniques described herein to focus the 60 GHz waves. Moreover, measured gain pattern 506 shows the high amplitude, narrow, focused beam radiation pattern resulting from having the GRIN lens according to the techniques described herein placed in front of the waveguide. In some examples of FIG. 13A, measured gain pattern 506 may have amplitude that is 21 times greater than the amplitude of measured gain pattern 504. In some examples of FIGS. 13A and 13B, measured gain 504 may have a low amplitude, broad, unfocused beam radiation pattern resulting from not having the GRIN lens according to the techniques described herein placed in front of the waveguide. In some examples of FIG. 13B, measured gain pattern 504 may have amplitude of 1.

Figure 14:
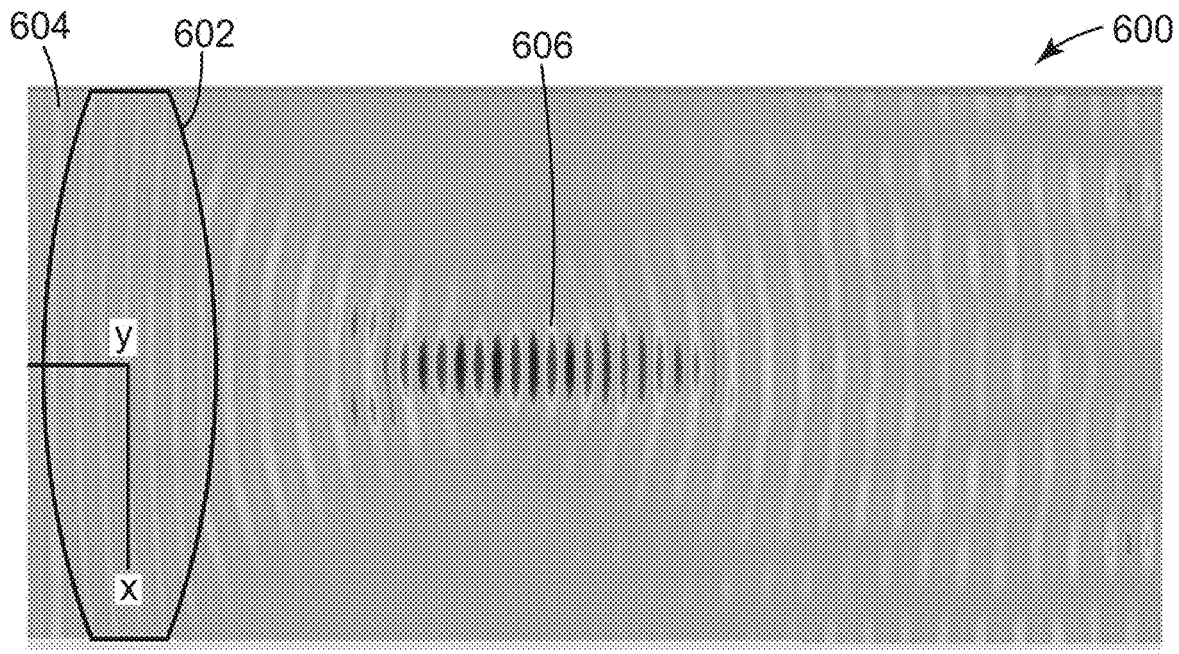
FIG. 14 is a conceptual diagram illustrating an example of the focusing effect of a first dielectric material with a single dielectric constant with a structure of a biconvex lens.

FIG. 14 is a conceptual diagram 600 illustrating an example of the focusing effect of a first dielectric material with a single dielectric constant with a structure of a biconvex lens. In the example of FIG. 14, the conceptual diagram 600 includes waves 604, a GRIN lens 602, and focused waves 606.

Waves 604 represent the waves passing through GRIN lens 602. GRIN lens 602 is represented as a biconvex lens structure, but may not be limited to this structure. Focused waves 606 represent the focusing effect on waves 604 after waves 604 pass through a GRIN lens, such as GRIN lens 602. In one example implementation, waves 604 may have a frequency of 60 GHz. In another example implementation, GRIN lens 602 may have one dielectric material forming the biconvex shape and dielectric profile providing lens functionality approximating that of a biconvex lens.

Figure 15:
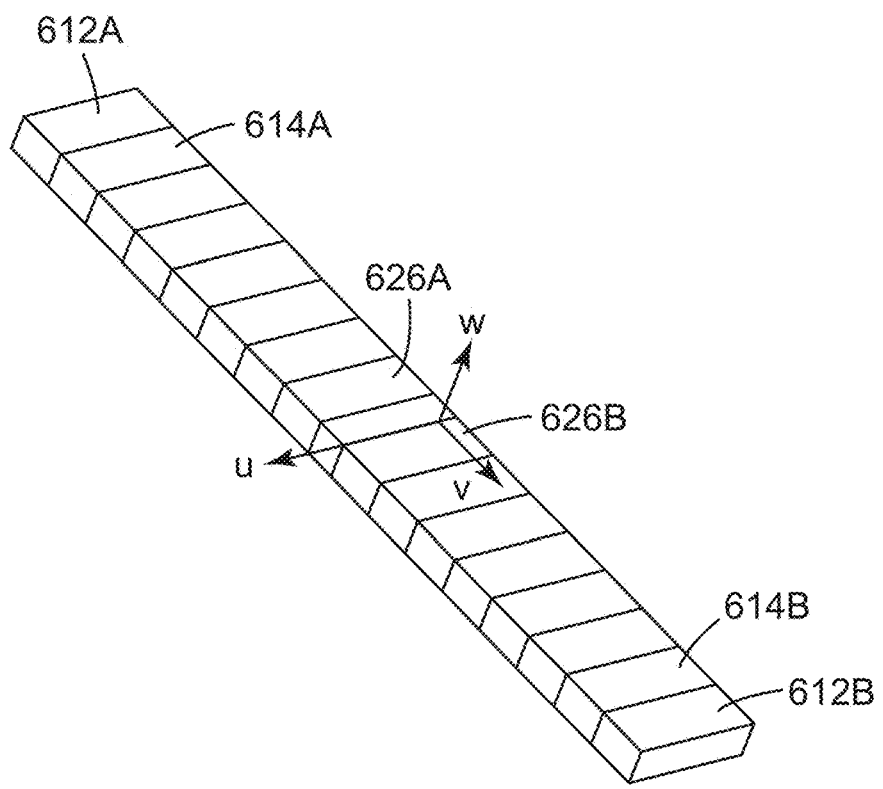
FIG. 15 is a conceptual diagram illustrating an example of a stepped GRIN lens including two or more dielectric materials with a stepped dielectric profile and focusing effect similar to a biconvex GRIN lens.

FIG. 15 is a conceptual diagram illustrating an example of a stepped GRIN lens 610 including two or more dielectric materials with a stepped dielectric profile and focusing effect similar to a biconvex lens. In the example of FIG. 15, stepped GRIN lens 610 includes a plurality of layers, such as layers 612A, 612B, 614A, 614B, 626A, 626B. In one example, the plurality of layers are symmetric across a u-axis to achieve the dielectric profile and focusing effect similar to a biconvex lens. In another example, the plurality of layers includes a plurality of voxels (not shown). In some examples, each color represents a specific dielectric constant that correlates with a boxed dielectric constant as shown and described in Table 1 of FIG. 12.

In one example implementation, each of the symmetric layers, such as layers 612A, 612B may have a similar ratio of a first dielectric material to a second dielectric material. In another example implementation, each of the symmetric layers, such as layers 612A, 612B may have a similar continuously varied ratio of a first dielectric material to a second dielectric material defined by the plurality of voxels. In some examples, symmetric layers 612A, 612B may have a similar effective dielectric constant because of the similar ratio of the first dielectric material to the second dielectric material. In other examples, symmetric layers 612A, 612B may have a similar effective dielectric constant because of the similar volumes of the first dielectric material to the second dielectric material. In yet other examples, symmetric layers 612A, 612B may have a similar effective dielectric constant because of the similar densities between the first dielectric material to the second dielectric material.

Figure 16:
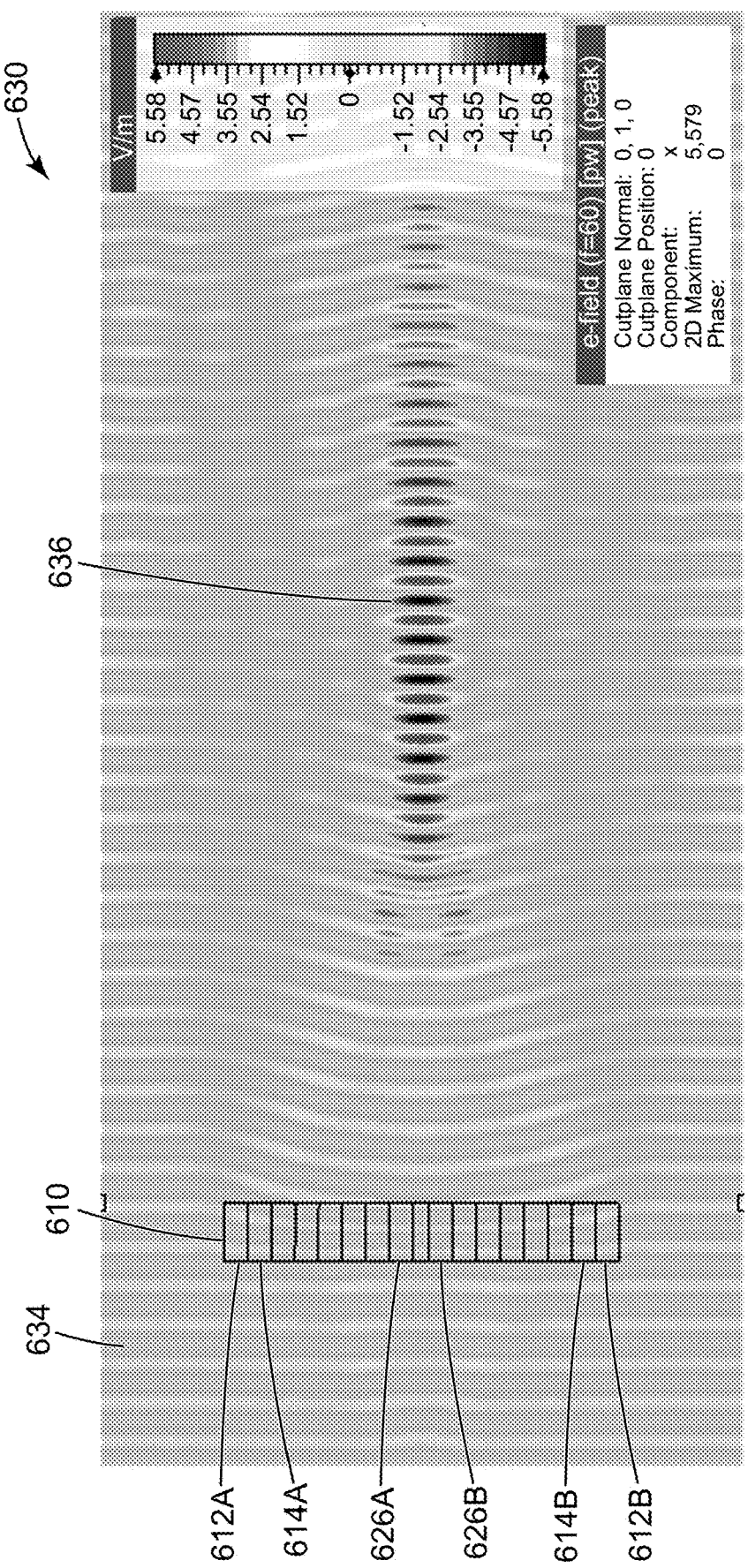
FIG. 16 is a conceptual diagram illustrating an example of the focusing effect of two or more dielectric materials forming a stepped dielectric profile according to one or more of the techniques disclosed herein.

FIG. 16 is a conceptual diagram 630 illustrating an example of the focusing effect of two or more dielectric materials forming a stepped dielectric profile according to the techniques disclosed herein. In the example of FIG. 16, the conceptual diagram 630 includes waves 634, a stepped GRIN lens 610 as described in FIG. 15, and focused waves 636. Stepped GRIN lens 610 was simulated, using computer simulation technology (CST) software, by directing a 60 GHz plane wave toward the lens. The plane wave originated in the positive u direction and traveled toward the lens in the negative u direction. The plane wave is parallel to the vw plane. Note that the uvw rectangular coordinate system is analogous with the xyz rectangular coordinate system.

Waves 634 represent the waves passing through stepped GRIN lens 610. Stepped GRIN lens 610 is depicted as a GRIN lens with flat sides, but may not be limited to this structure, and may be any structure subject to the limitations of AM device 24 as described in FIG. 1. Focused waves 636 represent the focusing effect on waves 634 after waves 634 pass through a GRIN lens, such as stepped GRIN lens 610 or GRIN lens 602 as described in FIG. 14.

In one example implementation, waves 634 may have a frequency of 60 GHz. In another example implementation, stepped GRIN lens 610 may have two or more dielectric materials forming a dielectric profile providing lens functionality approximating that of an imaging lens, such as a solid biconvex lens like GRIN lens 602 of FIG. 14, without the shape of a biconvex lens, as described in FIG. 15. In some examples, focused waves 636 may have a similar and/or approximate focusing effect as focused waves 606 as described in FIG. 14.

Figure 17:
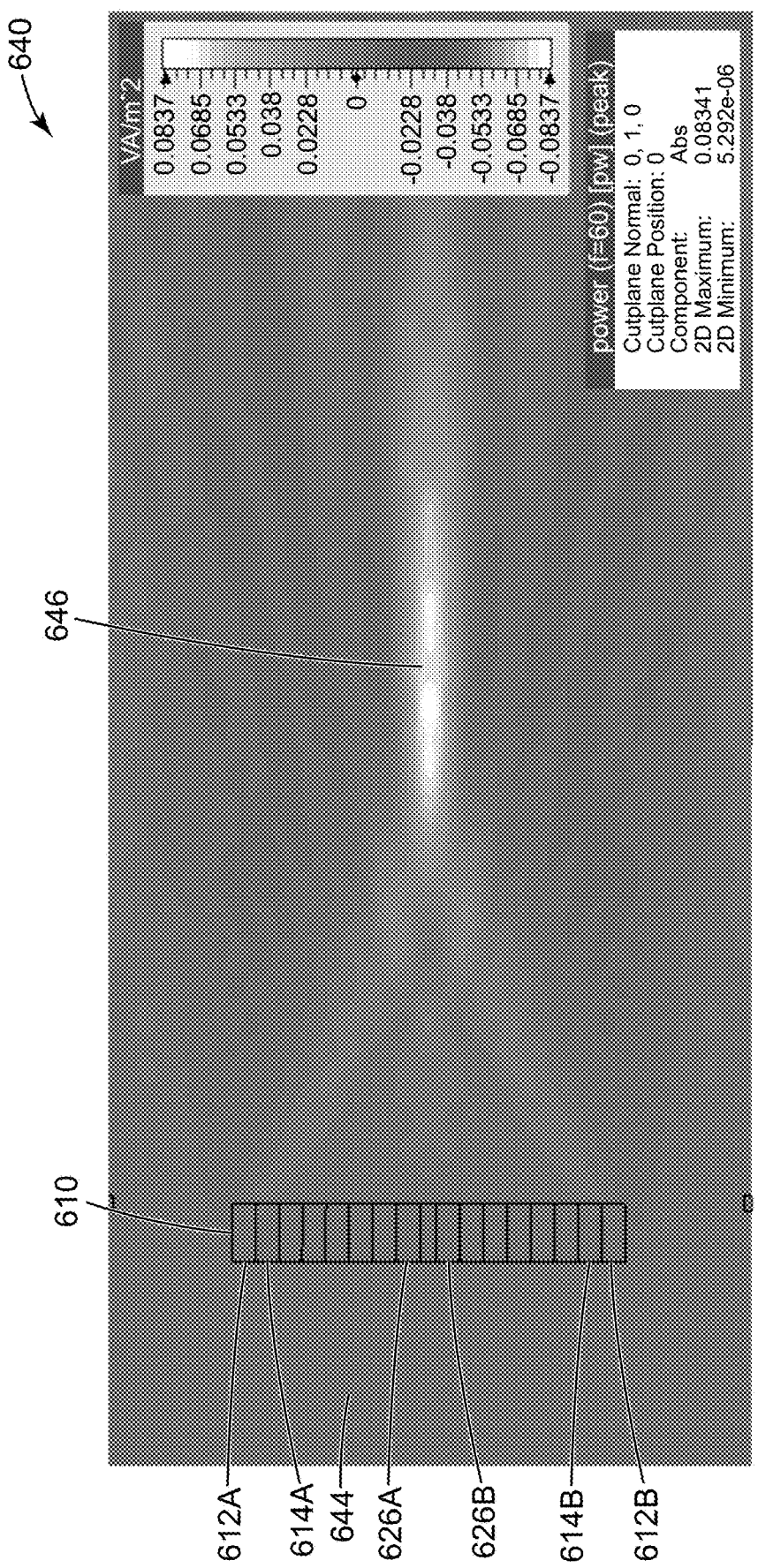
FIG. 17 is a conceptual diagram illustrating an example of the focusing effect of two or more dielectric materials forming a stepped dielectric profile according to one or more of the techniques disclosed herein.

FIG. 17 is a conceptual diagram illustrating an example of the focusing effect of two or more dielectric materials forming a stepped dielectric profile according to the techniques disclosed herein. In the example of FIG. 17, the conceptual diagram 640 includes waves 644, a stepped GRIN lens 610, and focused waves 646. Stepped GRIN lens 610 was simulated, using CST software, by directing a 60 GHz plane wave toward the lens. The plane wave originated in the positive u direction and traveled toward the lens in the negative u direction. The plane wave is parallel to the vw plane. Note that the uvw rectangular coordinate system is analogous with the xyz rectangular coordinate system.

Waves 644 represent the waves passing through stepped GRIN lens 610. Stepped GRIN lens 610 is depicted in FIG. 17 as a GRIN lens with flat sides, but may not be limited to this structure, and may be any structure subject to the limitations of AM device 24 as described in FIG. 1. Focused waves 646 represent the focusing effect on waves 644 after waves 644 pass through a GRIN lens, such as stepped GRIN lens 610 or GRIN lens 602 as described in FIG. 14.

In one example implementation, waves 644 may have a frequency of 60 GHz. In another example implementation, stepped GRIN lens 610 may have two or more dielectric materials forming a dielectric profile providing lens functionality approximating that of an imaging lens, such as a solid biconvex lens like GRIN lens 602 of FIG. 14, without the shape of a biconvex lens, as described in FIG. 15. In some examples, focused waves 646 may have a similar and/or approximate focusing effect as focused waves 606 as described in FIG. 14.

Figure 18:
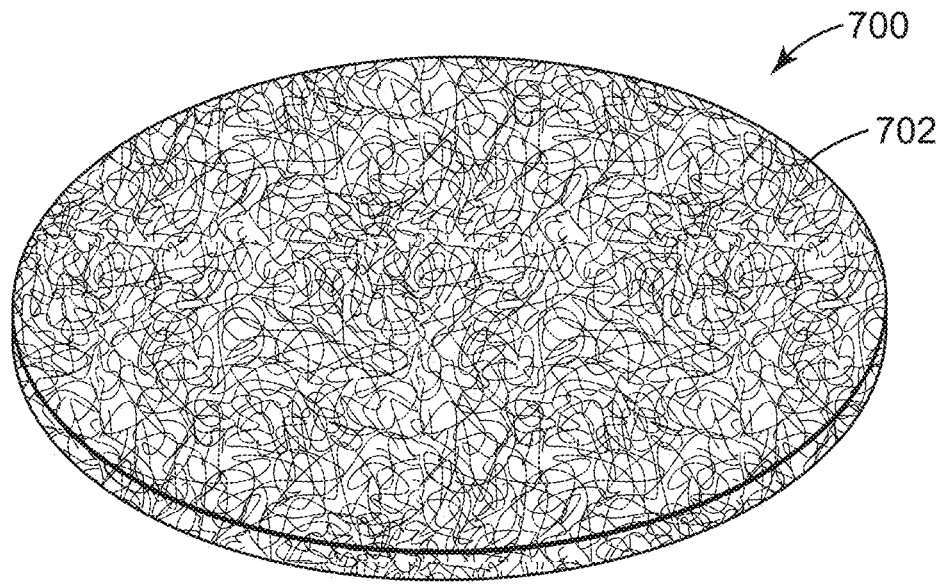
FIG. 18 illustrates an example of a non-woven structure with two or more dielectric materials according to one or more of the techniques disclosed herein.

FIG. 18 illustrates an example of a non-woven structure 700 with two or more dielectric materials according to the techniques disclosed herein. In the example of FIG. 18, the non-woven structure includes GRIN lens 702. GRIN lens 702 is depicted in FIG. 18 as a GRIN lens with a flat side and comprising a non-woven material.

In one example implementation, GRIN lens 702 may have two or more dielectric materials forming a dielectric profile providing lens functionality approximating that of an imaging lens, such as a solid biconvex lens like GRIN lens 602 of FIG. 14, without the shape of a biconvex lens, as described in FIG. 15. In some examples, GRIN lens 702 may be formed by AM device 24 as described by FIG. 1, and AM device 24 may generate a random or pseudo-random extrusion path of 3D printed material corresponding to a defined ratio of volumes between two or more dielectric materials. In the example of FIG. 18, an effective dielectric constant of a GRIN lens 702 is a function of the local print density of the extruded material. In some examples, the non-woven structure of GRIN lens 702 may include an arrangement of one or more volume elements having an arrangement of one or more lines formed by the additive manufacturing process. In other examples, the volumetric ratio of the first dielectric material to the second dielectric material in the respective volume elements is controlled by a line width of the first dielectric material formed by the additive manufacturing process. In some examples, the arrangement of one or more volume elements may include an array of randomly extruded paths of at least the first dielectric material.

Figure 19:
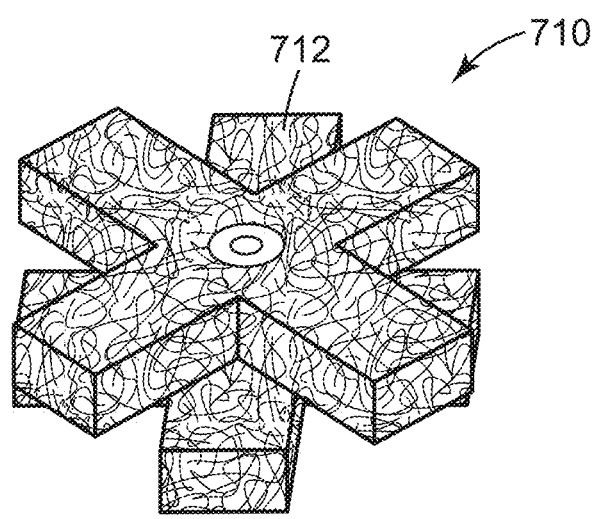
FIG. 19 illustrates another example of a non-woven structure with two or more dielectric materials according to one or more of the techniques disclosed herein.

FIG. 19 illustrates another example of a non-woven structure 710 with two or more dielectric materials according to the techniques disclosed herein. In the example of FIG. 19, the non-woven structure includes GRIN lens 712. GRIN lens 712 is depicted in FIG. 19 as a GRIN lens with a plurality of spokes and comprising a non-woven material. In one example implementation, GRIN lens 712 may have two or more dielectric materials forming a dielectric profile providing lens functionality approximating that of an imaging lens, such as a solid biconvex lens like GRIN lens 602 of FIG. 14, without the shape of a biconvex lens, as described in FIG. 15. In some examples, GRIN lens 712 may be formed by AM device 24 as described by FIG. 1, and AM device 24 may generate a random array of voxels corresponding to a defined ratio of volumes between two or more dielectric materials.

Figure 20:
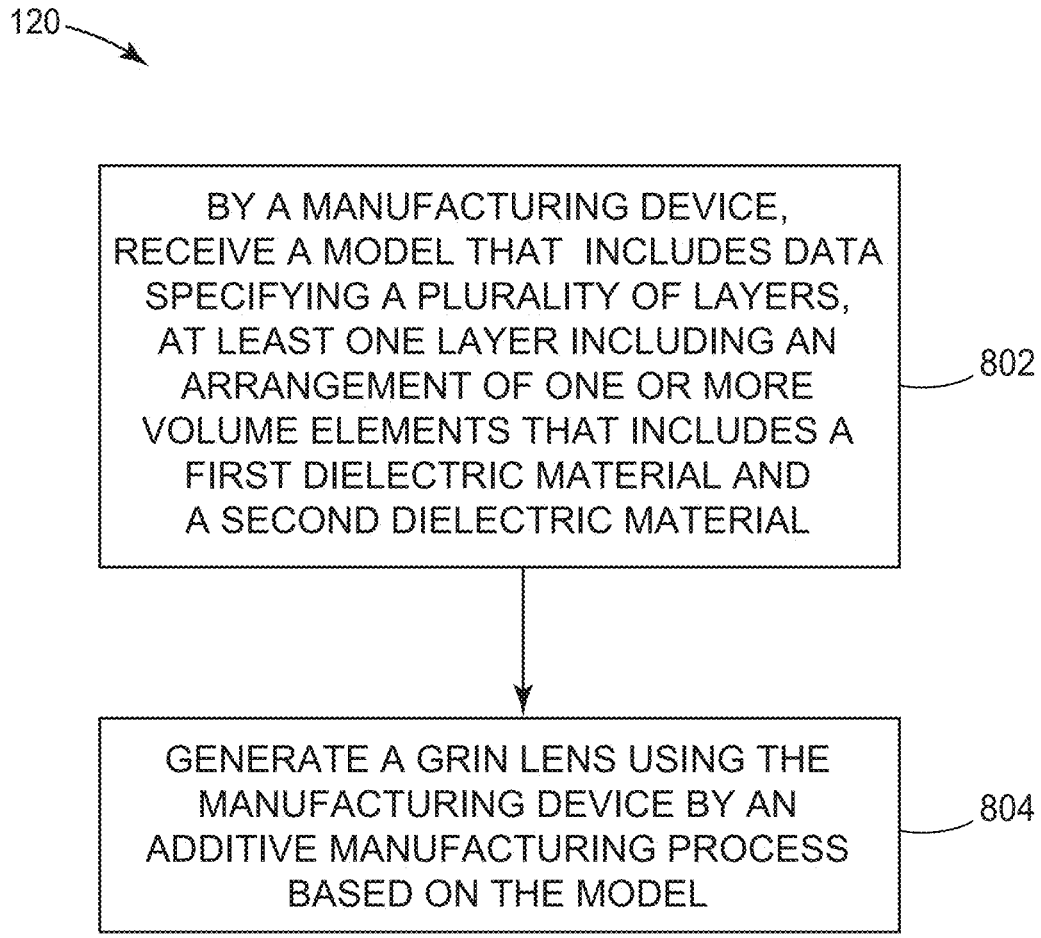
FIG. 20 is a flowchart illustrating an example process of an additive manufacturing device generating a 3D GRIN lens with two or more dielectric materials according to the techniques disclosed herein.

FIG. 20 is a flowchart illustrating an example operation 800 of an additive manufacturing device 24 generating a 3D GRIN lens with two or more dielectric materials according to the techniques disclosed herein. For purposes of example, FIG. 20 will be described with respect to AM device 24 of FIG. 1.

Initially, AM device 24 receives a model that includes data specifying a plurality of layers, at least one layer including an arrangement of one or more volume elements that includes a first dielectric material and a second dielectric material (802). For example, AM device 24 may be a manufacturing device having one or more processors, which receives a model comprising data specifying a plurality of layers, wherein at least one layer of the plurality of layers comprises an arrangement of one or more volume elements comprising a first dielectric material and a second dielectric material, wherein the at least one layer of the plurality of layers has a dielectric profile that is made up of a plurality of different effective dielectric constants of the volume elements in the layer. In some examples, each of the local effective dielectric constants is a function of a volumetric ratio of the first dielectric material to the second dielectric material in the respective volume elements, a dielectric constant of the first dielectric material, and a dielectric constant of the second dielectric material. After AM device 24 receives the model, AM device 24 generates a GRIN lens by an additive manufacturing process based on the model (804). In some examples, the at least one layer of the plurality of layers has a dielectric profile that is made up of a plurality of different effective dielectric constants of the volume elements in the layer.

Various examples of the disclosure have been described. These and other examples are within the scope of the following claims.

What is claimed is:

1. A method of forming a gradient index (GRIN) lens for propagating an electromagnetic wave, the method comprising:
   receiving, by a manufacturing device having one or more processors, a model comprising data specifying a plurality of layers,
   wherein at least one layer of the plurality of layers comprises an arrangement of one or more volume elements comprising a first dielectric material and a second dielectric material,
   wherein the at least one layer of the plurality of layers has a dielectric profile that is made up of a plurality of different effective dielectric constants of the volume elements in the layer, and
   wherein one or more lines in a first one of the plurality of layers has a grid pattern; and
   generating, with the manufacturing device by an additive manufacturing process, the GRIN lens based on the model.

2. The method of claim 1, wherein each of the local effective dielectric constants is a function of a volumetric ratio of the first dielectric material to the second dielectric material in the respective volume elements, a dielectric constant of the first dielectric material, and a dielectric constant of the second dielectric material.

3. The method of claim 1, wherein a thickness of each of the plurality of layers is smaller than a wavelength of the electromagnetic wave.

4. The method of claim 1, wherein a thickness of each of the plurality of layers is between one tenth and one fifteenth the length of a wavelength of the electromagnetic wave.

5. The method of claim 1, wherein the arrangement of one or more volume elements comprises an arrangement of one or more lines formed by the additive manufacturing process.

6. The method of claim 1, wherein one or more lines in a first second one of the plurality of layers are arranged in a spoke pattern, wherein one or more lines in a third one of the plurality of layers are arranged in a ring pattern wherein the second one of the plurality of layers is adjacent to the first one of the plurality of layers, and wherein the third one of the plurality of layers is adjacent to the second one of the plurality of layers.

7. The method of claim 1, wherein the one or more lines in a second one of the plurality of layers are arranged in a ring pattern, wherein one or more lines in a third one of the plurality of layers are arranged in a spoke pattern, wherein the second one of the plurality of layers is adjacent to the first one of the plurality of layers, and wherein the third one of the plurality of layers is adjacent to the second one of the plurality of layers.

8. The method of claim 1, wherein the volumetric ratio of the first dielectric material to the second dielectric material in the respective volume elements is controlled by a line width of the first dielectric material formed by the additive manufacturing process.

9. The method of claim 1, wherein the arrangement of one or more volume elements comprises an array of randomly extruded paths of at least the first dielectric material.

10. The method of claim 1, wherein the first dielectric material comprises at least one of a first photo-reactive resin or a first thermoplastic resin, and wherein the second dielectric material comprises air.

11. The method of claim 1, wherein the first dielectric material comprises at least one of a first photo-reactive resin or a first thermoplastic resin, and wherein the second dielectric material comprises at least one of a second photo-reactive resin or a second thermoplastic resin.

12. The method of claim 1, wherein the additive manufacturing process comprises a three-dimensional (3D) printing process.

13. The method of claim 1, wherein the additive manufacturing process comprises a two-photon photopolymerization process.

14. The method of claim 1, wherein the dielectric profile is selected to enable the GRIN lens to focus the electromagnetic wave.

15. The method of claim 1, wherein a frequency of the electromagnetic wave is within a millimeter wave band.

16. The method of claim 1, wherein a frequency of the electromagnetic wave is 60 GHz.

17. The GRIN lens of claim 1, wherein a thickness of each of the plurality of layers is smaller than a wavelength of the electromagnetic wave.

18. A computer system comprising:
a memory; and
one or more processors communicatively coupled to the memory, the one or more processors being configured to:
receive a model comprising data specifying a plurality of layers, wherein at least one layer of the plurality of layers comprises an arrangement of one or more volume elements comprising a first dielectric material and a second dielectric material, wherein the at least one layer of the plurality of layers has a dielectric profile that is made up of a plurality of different effective dielectric constants of the volume elements in the layer, and wherein one or more lines in a first one of the plurality of layers has a grid pattern; and
generate, by an additive manufacturing process, the GRIN lens based on the model.

19. A gradient index (GRIN) lens for propagating an electromagnetic wave, the lens comprising:
a plurality of layers additively formed to comprise a plurality of volume elements, wherein at least one layer of the plurality of layers comprises an arrangement of the one or more volume elements, wherein each of the volume elements comprises a first dielectric material and a second dielectric material,
wherein the at least one layer of the plurality of layers has a dielectric profile that is made up of a plurality of different effective dielectric constants of the volume elements in the layer, and
wherein one or more lines in a first one of the plurality of layers has a grid pattern, and
wherein each of the local effective dielectric constants is a function of a volumetric ratio of the first dielectric material to the second dielectric material in the respective volume elements, a dielectric constant of the first dielectric material, and a dielectric constant of the second dielectric material.

* * * * *